US012743704B2

(12) United States Patent
Aurongzeb et al.

(10) Patent No.: US 12,743,704 B2
(45) Date of Patent: Sep. 22, 2026

(54) SYSTEM AND METHOD FOR INTELLIGENTLY RECOVERING A CLIENT INFORMATION HANDLING SYSTEM FROM AN UNSUSTAINABLE STATE IN GREENHOUSE GAS EMISSIONS OVER A DEVICE LIFE CYCLE

(71) Applicant: Dell Products, LP, Round Rock, TX (US)

(72) Inventors: Deeder M. Aurongzeb, Austin, TX (US); Malathi Ramakrishnan, Madurai (IN); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 823 days.

(21) Appl. No.: 17/967,081

(22) Filed: Oct. 17, 2022

(65) Prior Publication Data

US 2024/0127262 A1 Apr. 18, 2024

(51) Int. Cl.
*G06Q 30/00* (2023.01)
*G06Q 10/20* (2023.01)
*G06Q 30/018* (2023.01)

(52) U.S. Cl.
CPC .......... *G06Q 30/018* (2013.01); *G06Q 10/20* (2013.01)

(58) Field of Classification Search
CPC ............................ G06Q 30/018; G06Q 10/20
See application file for complete search history.

(56) References Cited

U.S. PATENT DOCUMENTS 8,626,450 B2 * 1/2014 Dooley .................. F22B 37/38 122/459
9,760,474 B2 * 9/2017 Pillai .................... G06F 1/3206
(Continued)

FOREIGN PATENT DOCUMENTS

WO 2011/106160 A2 9/2011

OTHER PUBLICATIONS

Chan, et al. "Telecommunications Energy and Greenhouse Gas Emissions Management for Future Network Growth." Applied Energy, vol. 166, 2016, pp. 174-185. (Year: 2016).*
(Continued)

*Primary Examiner* — Luis A Brown
(74) *Attorney, Agent, or Firm* — Prol Intellectual Property Law, PLLC; H. Kenneth Prol

(57) ABSTRACT

A carbon dioxide (CO2) emissions state remediation system executing on a unified endpoint management platform information handling system may comprise a network interface device to receive operational telemetry measurements for a client device during routine monitoring intervals, including a CO2 emissions value exceeding a non-eco-friendly state transition threshold value for the client device and indication of a failed hardware component, the hardware processor to predict, via a neural network modeling a relationship between changes in CO2 emissions values and changes in operational telemetry measurements, that replacement of the failed hardware component with a new replacement component having a known power efficiency value will cause a future determined CO2 emissions value for the client device to fall below the non-eco-friendly state transition threshold value, and the network interface device to transmit a replacement instruction for display to a user of the client device to install the new replacement component.

20 Claims, 5 Drawing Sheets

(56) References Cited

U.S. PATENT DOCUMENTS 10,417,614 B2 9/2019 Johnson
10,705,786 B2* 7/2020 Liu ........................ G06F 3/1454
10,977,293 B2* 4/2021 Cai ..................... G06F 16/3329
11,663,297 B2* 5/2023 Boyapalle ............. G06F 21/554 706/12
2009/0292617 A1 11/2009 Sperling
2010/0070404 A1 3/2010 McConnell
2012/0323615 A1* 12/2012 Johnson ........... G06Q 10/06311 705/7.11
2014/0100937 A1 4/2014 Na
2014/0316964 A1* 10/2014 Slutsker ................. G06Q 40/04 705/37
2017/0123857 A1 5/2017 Khan
2019/0349321 A1 11/2019 Cai
2021/0004328 A1* 1/2021 Wang .................. G06F 12/0842
2021/0124672 A1* 4/2021 Abdelhalim .......... G06F 11/327
2022/0214955 A1* 7/2022 Jakes .................. G06F 11/0751
2022/0344934 A1* 10/2022 Jayan ..................... G06Q 50/06
2022/0417117 A1* 12/2022 Tayeb ..................... H04L 41/28
2023/0017632 A1* 1/2023 Herb ................... G06F 11/3006
2023/0239211 A1* 7/2023 Palmero .............. H04L 41/0833
2024/0028024 A1* 1/2024 Aurongzeb ............ G06Q 50/26
2024/0029078 A1* 1/2024 Aurongzeb ........... G06F 1/3296
2024/0029096 A1* 1/2024 Aurongzeb ........ G06Q 30/0207
2024/0036999 A1* 2/2024 Aurongzeb ........... G06F 9/5055
2024/0037002 A1* 2/2024 Aurongzeb ............. G06F 9/542
2024/0103051 A1* 3/2024 Aurongzeb ............ G01R 21/00
2024/0126668 A1* 4/2024 Aurongzeb .............. G06N 3/08
2024/0127262 A1* 4/2024 Aurongzeb ............ G06Q 10/20
2024/0134346 A1* 4/2024 Aurongzeb ........ G05B 19/4155

OTHER PUBLICATIONS

Hertwich, Edgar, et al. “Material Efficiency Strategies to Reducing Greenhouse Gas Emissions Associated with Buildings, Vehicles, and Electronics—A Review.” Environmental Research Letters, vol. 14, No. 4, 2019. (Year: 2019).*

Coelho, et al. “Environmental Analysis of a Construction and Demolition Waste Recycling Plant in Portugal—Part 1: Energy Consumption and CO2 Emissions.” Waste Management, vol. 33, 2013, pp. 1258-1267. (Year: 2013).*

C. Herrmann, et al., “Sustainability as Strategic Business Model for Profitable Business,” 6 pages, May 2014.

A. Stenhall, “What is the carbon footprint of a typical corporate laptop?,” 4 pages, Oct. 2020 https://climatesmartit.com/2020/10/25/what-is-the-carbon-footprint-of-a-typical-corporate-laptop/.

K. Abnett, et al., “EU proposes world’s first carbon border tax for some imports,” 8 pages, Jul. 2021 https://www.reuters.com/business/sustainable-business/eu-proposes-worlds-first-carbon-border-tax-some-imports-2021-07-14/.

* cited by examiner

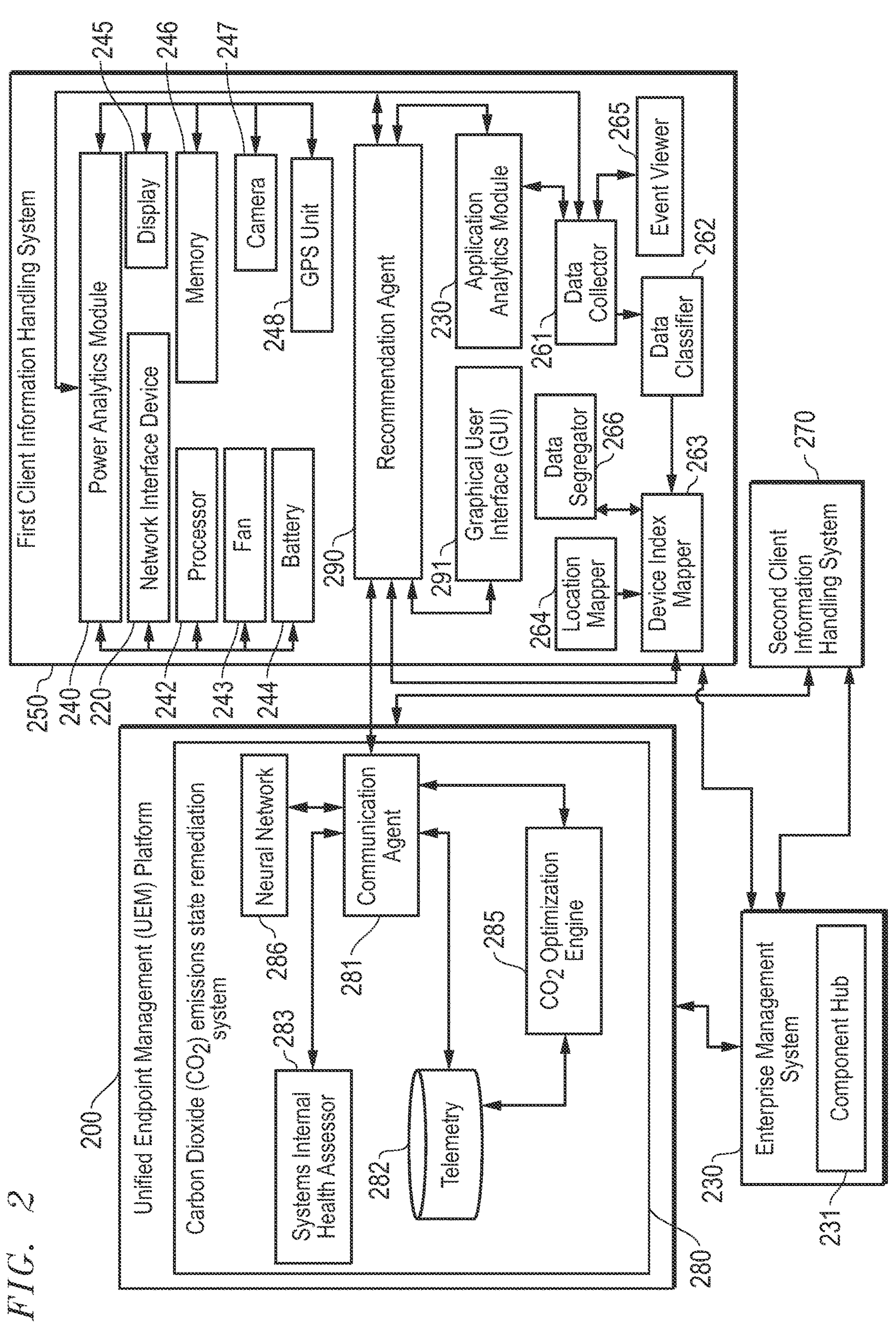
FIG. 2
First Client Information Handling System
Power Analytics Module
Display
Memory
Camera
GPS Unit
Network Interface Device
Processor
Fan
Battery
Recommendation Agent
Application Analytics Module
Graphical User Interface (GUI)
Data Collector
Event Viewer
Data Classifier
Data Segregator
Location Mapper
Device Index Mapper
Second Client Information Handling System
Unified Endpoint Management (UEM) Platform
Carbon Dioxide ($CO_2$) emissions state remediation system
Neural Network
Communication Agent
$CO_2$ Optimization Engine
Systems Internal Health Assessor
Telemetry
Enterprise Management System
Component Hub
245
246
247
265
262
261
230
248
290
291
266
263
264
270
250
240
220
242
243
244
200
286
281
285
283
282
280
230
231

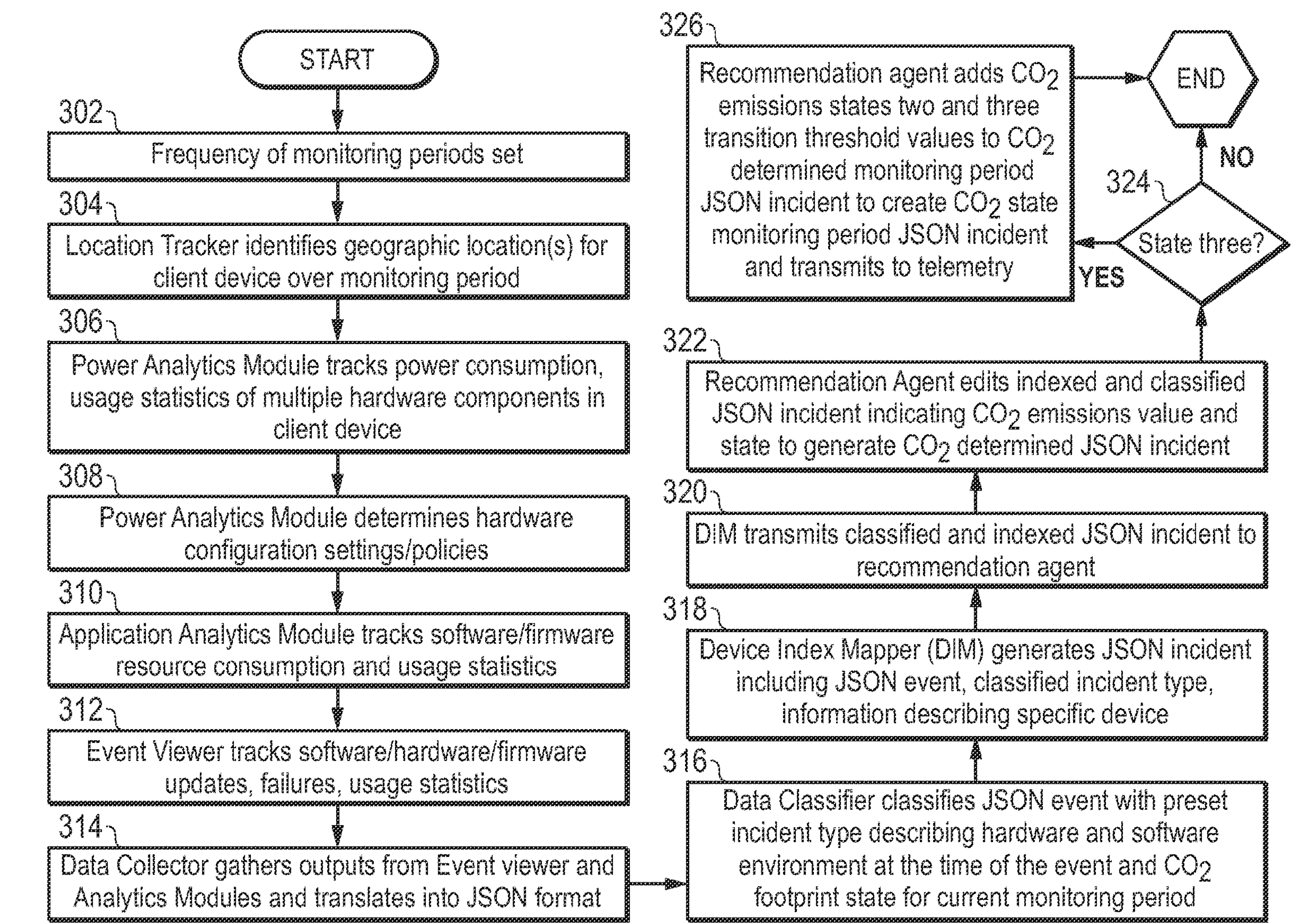
FIG. 3
START
302
Frequency of monitoring periods set
304
Location Tracker identifies geographic location(s) for client device over monitoring period
306
Power Analytics Module tracks power consumption, usage statistics of multiple hardware components in client device
308
Power Analytics Module determines hardware configuration settings/policies
310
Application Analytics Module tracks software/firmware resource consumption and usage statistics
312
Event Viewer tracks software/hardware/firmware updates, failures, usage statistics
314
Data Collector gathers outputs from Event viewer and Analytics Modules and translates into JSON format
316
Data Classifier classifies JSON event with preset incident type describing hardware and software environment at the time of the event and $CO_2$ footprint state for current monitoring period
318
Device Index Mapper (DIM) generates JSON incident including JSON event, classified incident type, information describing specific device
320
DIM transmits classified and indexed JSON incident to recommendation agent
322
Recommendation Agent edits indexed and classified JSON incident indicating $CO_2$ emissions value and state to generate $CO_2$ determined JSON incident
324
State three?
YES
NO
326
Recommendation agent adds $CO_2$ emissions states two and three transition threshold values to $CO_2$ determined monitoring period JSON incident to create $CO_2$ state monitoring period JSON incident and transmits to telemetry
END

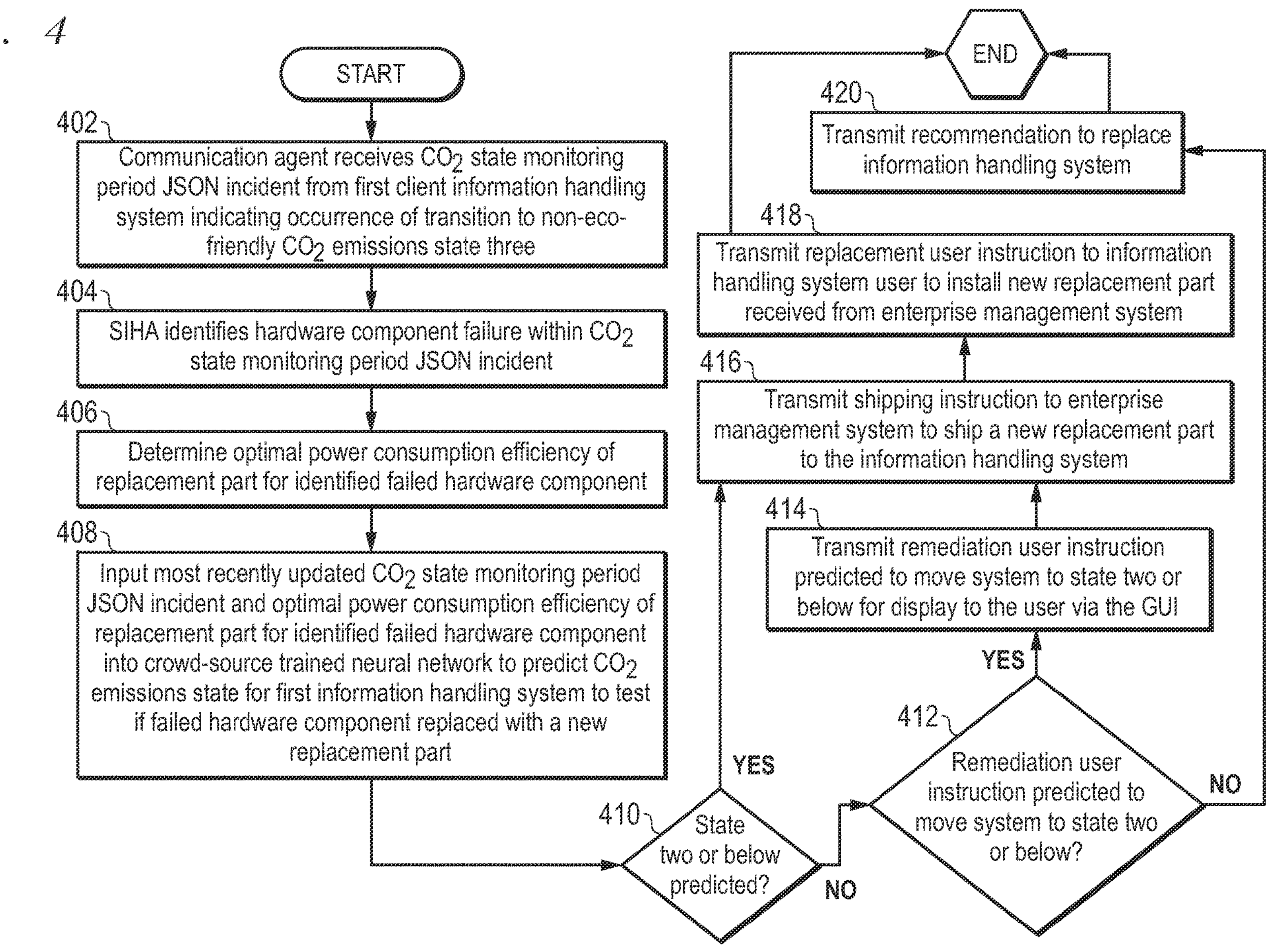
FIG. 4
START
402
Communication agent receives CO2 state monitoring period JSON incident from first client information handling system indicating occurrence of transition to non-eco-friendly CO2 emissions state three
404
SIHA identifies hardware component failure within CO2 state monitoring period JSON incident
406
Determine optimal power consumption efficiency of replacement part for identified failed hardware component
408
Input most recently updated CO2 state monitoring period JSON incident and optimal power consumption efficiency of replacement part for identified failed hardware component into crowd-source trained neural network to predict CO2 emissions state for first information handling system to test if failed hardware component replaced with a new replacement part
410
State two or below predicted?
YES
NO
412
Remediation user instruction predicted to move system to state two or below?
YES
NO
414
Transmit remediation user instruction predicted to move system to state two or below for display to the user via the GUI
416
Transmit shipping instruction to enterprise management system to ship a new replacement part to the information handling system
418
Transmit replacement user instruction to information handling system user to install new replacement part received from enterprise management system
420
Transmit recommendation to replace information handling system
END

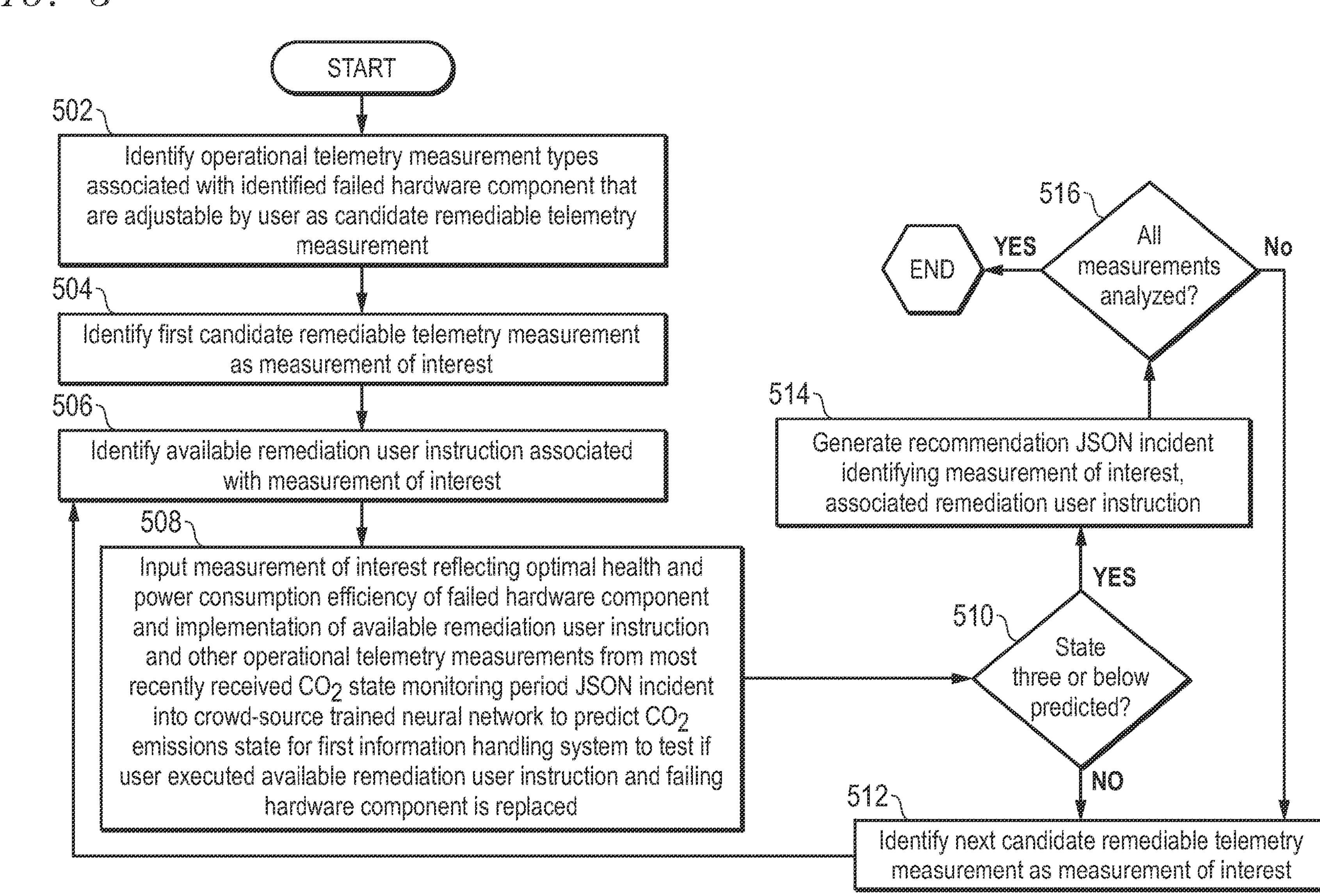
FIG. 5
START
502
Identify operational telemetry measurement types associated with identified failed hardware component that are adjustable by user as candidate remediable telemetry measurement
504
Identify first candidate remediable telemetry measurement as measurement of interest
506
Identify available remediation user instruction associated with measurement of interest
508
Input measurement of interest reflecting optimal health and power consumption efficiency of failed hardware component and implementation of available remediation user instruction and other operational telemetry measurements from most recently received $CO_2$ state monitoring period JSON incident into crowd-source trained neural network to predict $CO_2$ emissions state for first information handling system to test if user executed available remediation user instruction and failing hardware component is replaced
510
State three or below predicted?
YES
NO
512
Identify next candidate remediable telemetry measurement as measurement of interest
514
Generate recommendation JSON incident identifying measurement of interest, associated remediation user instruction
516
All measurements analyzed?
YES
No
END

SYSTEM AND METHOD FOR INTELLIGENTLY RECOVERING A CLIENT INFORMATION HANDLING SYSTEM FROM AN UNSUSTAINABLE STATE IN GREENHOUSE GAS EMISSIONS OVER A DEVICE LIFE CYCLE

FIELD OF THE DISCLOSURE

The present disclosure generally relates to determining an amount of greenhouse gas emissions that may be attributable to operation of an information handling system based on age of the device. More specifically, the present disclosure relates to a carbon dioxide (CO2) emissions state remediation system for remediating non-eco-friendly CO2 emissions due to inefficient operation of a client information handling system not due to the age of the device over the entire lifecycle of the client information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 2 is a block diagram illustrating a carbon dioxide (CO2) emissions state remediation system according to an embodiment of the present disclosure;

FIG. 3 is a flow diagram illustrating a method of gathering power and application analytics for identifying a hardware component failure or a remediation user instruction according to an embodiment of the present disclosure;

FIG. 4 is a flow diagram illustrating a method of transmitting a replacement user instruction or a remediation user instruction to a client information handling system according to an embodiment of the present disclosure; and FIG. 5 is a flow diagram illustrating a method of identifying a remediation user instruction predicted to remediate the non-eco-friendly CO2 emissions state of a client information handling system according to an embodiment of the present disclosure.

The use of the same reference symbols in different drawings may indicate similar or identical items.

DETAILED DESCRIPTION OF THE DRAWINGS

Figure 1:
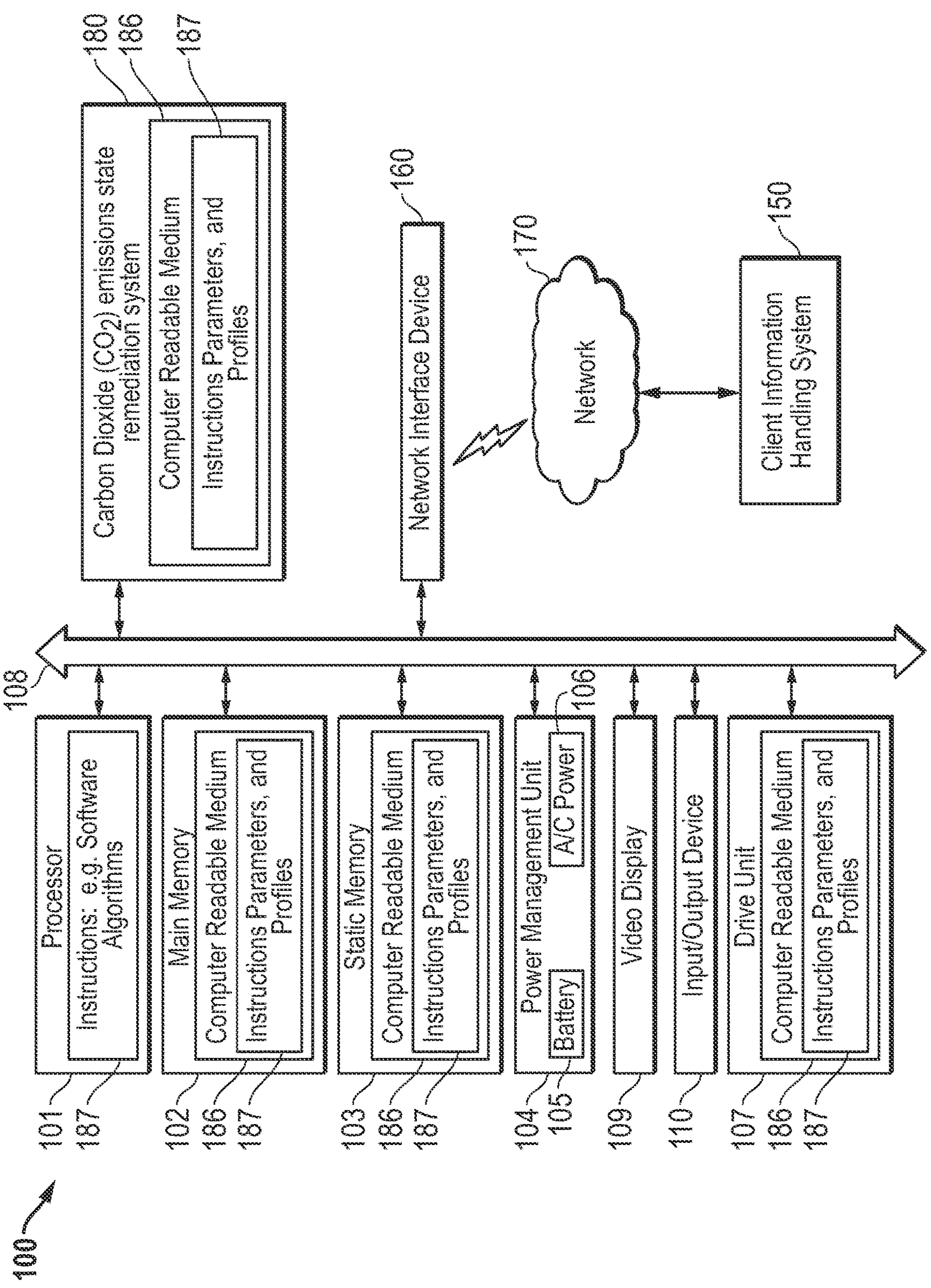
FIG. 1 is a block diagram illustrating a cloud-based UEM platform information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. One major impact on such GHG emissions is efficiency of device operation, including software application execution, hardware operation, and power consumption at end devices such as information handling systems operated by an end user. This efficiency measure may decrease when client information handling systems are used inefficiently or poorly maintained by a user (e.g., failure to update software or firmware, constant execution of background applications, high workload, maintaining multiple browsing sessions simultaneously, hardware components set to high performance mode rather than eco-friendly mode). These circumstances may be avoidable through warnings or recommendations provided to the user. However, this efficiency measure may also decrease as the client information handling system ages, due to unavoidable wear and tear on components. Goals may be set for capping CO2 emissions due to operation of each client information handling system that takes the age of the device and its components into account.

In various embodiments described herein, the life cycle of each client information handling system may be divided into three states. These states include a first, peak-health training state, immediately following initial purchase and use of the device, a monitoring second state in which the client information handling system consistently meets the goal for capping CO2 emissions, and a non-eco-friendly third state in which inefficient operation of the device unrelated to age causes the client information handling system to fail to meet that goal. Each of the threshold CO2 emissions values defining these states may be unique to each client information handling system and may take into account the age of each device. For example, the first state may be defined by a maximum value of pounds of CO2 emitted per hour measured during a preset three or six month period following initial operation of the client information handling system. During this first state, it is assumed that the client information handling system is working at peak efficiency. In other words, it is assumed that the client information handling system is not experiencing efficiency loss due to age or due to inefficient use of the device. This first state threshold maximum value of pounds of CO2 emitted per hour may provide a benchmark against which future efficiency of the client information handling system may be measured.

As described above, some decrease in operational efficiency at each client information handling system is unavoidable due to wear and tear of components, such as, for example, the battery. Thus, the CO2 emitted per hour is expected to increase over time, even when the client device is being used as efficiently as possible, due to decreased efficiency of the battery as it ages. In other words, even if the updating and execution of software and firmware and power consumption of various components are optimized for minimizing CO2 emissions, increases in CO2 emissions during operation of the client information handling system will still occur. Such unavoidable increases in CO2 emissions due to aging are differentiated from further increases in CO2 emissions due to avoidable inefficient usage of the client information handling system (e.g., due to failure to perform updates, non-optimized execution of software or firmware, or non-eco-friendly power consumption by hardware components) in embodiments of the present disclosure.

The second state in embodiments of the present disclosure defines a maximum CO2 emissions value for the client information handling system when the device is being used as efficiently as possible, but that also takes into account the age of the client information handling system and its components (e.g., battery). This maximum CO2 emissions value defining the second state in embodiments may be referred to herein as a non-eco-friendly state transition threshold value, before transition to a third-non-eco-friendly state. For example, the non-eco-friendly state transition threshold value in embodiments may be determined by weighting the threshold maximum CO2 emissions value defining the first state (e.g., in which the client information handling system is assumed to be operating at peak efficiency, optimized to minimize CO2 emissions) by a decrease in efficiency of the battery due to age. When operation of the client information handling system causes emission of CO2 beyond this non-eco-friendly state transition threshold value, the client information handling system may pass from the second state to the third, non-eco-friendly state, in which inefficient operation of the device unrelated to age causes increased CO2 emissions. In such a way, the recommendation agent may estimate CO2 emissions for optimally efficient usage of the client information handling system, given the unavoidable drop in efficiency of its battery, when operating in the second state.

The CO2 emissions state remediation system in embodiments of the present disclosure may provide remediation user instructions for remediating or returning a client information handling system back to the first or second CO2 emissions state, upon determination of a hardware failure that has caused the client information handling system to transition to the non-eco-friendly third CO2 emission state. In some cases, replacement of a failed hardware component alone may not be sufficient to return a client information handling system to the eco-friendly first or second CO2 emissions states described directly above. For example, in some cases, inefficient usage of hardware components or software applications at a client information handling system may cause the hardware failure and consequently, the transition to the non-eco-friendly CO2 emissions state three. In such a scenario, replacement of the failed hardware component may fail to remedy the inefficient usage of hardware components or software applications, and may result in another failure of the replacement part in the near future. This may inhibit or limit the duration of any remediation of the client information handling system back to the eco-friendly first or second CO2 emissions states.

The CO2 emissions state remediation system in embodiments of the present disclosure address this issue by predicting whether replacement of the failed hardware component alone may return the client information handling system to the eco-friendly first or second CO2 emissions states. The cloud-based CO2 emissions state remediation system in embodiments may make such a prediction using a neural network modelling a relationship between changes in CO2 emissions values and changes in client device operational telemetry measurements, and in particular, user-adjustable operational telemetry measurements that may be affected by command to alter function of the client information handling system. In a particular embodiment, this modelled relationship between CO2 emissions and changes in operational telemetry may be conducted with respect to client information handling systems having similar usage profiles or usage purposes for client information handling systems.

When the CO2 emissions state remediation system in embodiments of the present disclosure predict that replacement of the failed component with a new part will not return the client information handling system back to the eco-friendly first or second CO2 emissions states, the CO2 emissions state remediation system may identify remediation user instructions that will accomplish this goal, when implemented at the client information handling system in addition to replacement of the failed component. The cloud-based CO2 emissions state remediation system in various embodiments may use the modeled relationship of the neural network described directly above to identify one or more changes in power measurements, software analytics measurements, or error log events that could cause an individual client information handling system to return from the non-eco-friendly third state back to the second state. For example, the cloud-based CO2 emissions state remediation system in embodiments may predict that a user remediation instruction to perform an action such as decreasing power consumption by a specific hardware component, lowering workload by a specific software application, performing a critical update to firmware, or capping usage of background software applications may cause a future transition from the non-eco-friendly third state back to the eco-friendly second state at a particular client information handling system.

The CO2 emissions state remediation system in embodiments described herein may communicate with an enterprise system parts replacement hub tracking replacement parts and a plurality of client information handling systems within an enterprise network to ship a new replacement part for the identified failed hardware component to the client information handling system. In the case where the CO2 emissions state remediation system has identified a remediation user instruction for changing power measurements, software analytics measurements, or error log events (e.g., as described directly above) may also be required to return the client information handling system to the eco-friendly first or second CO2 emissions states, the identified remediation user instruction may also be transmitted to the client information handling system for display to the user via a graphical user interface (GUI). In some embodiments, the CO2 emissions state remediation system may delay shipment of the new replacement part to the client information handling system until it has received confirmation that the user has implemented the recommended changes at the client information handling system. In such a way, the CO2 emissions state remediation system in embodiments of the present disclosure may orchestrate replacement of failed hardware components across an enterprise network and provide any additional remediation user instructions for adjustments to the operation of a client information handling system necessary to return the client information handling system to an eco-friendly CO2 emissions state one or two.

FIG. 1 illustrates an information handling system 100 according to several aspects of the present disclosure. As described herein, a cloud-based CO2 emissions state remediation system 180 may determine recommended replacements for failed hardware and remediation user instructions to return a client information handling system (e.g., 150) from a non-eco-friendly CO2 emissions third state to an eco-friendly CO2 emissions state one or two. Each of the three CO2 emissions states in an embodiment may be determined by the recommendation agent at that client information handling system 150 and attributed to inefficiencies not related to age of the client information handling system (e.g., 150) or its various hardware components, in some embodiments herein. Client device operational telemetry measurements, both user-adjustable and other operational telemetry measurements, including power analytics, software application analytics, and event viewer error logs, as well as determined CO2 emissions values and state transition threshold values particular to each client information handling systems (e.g., 150) that may be gathered during routine monitoring periods from a plurality of client information handling systems (e.g., 150) at the UEM platform 100 executing the cloud-based CO2 emissions state remediation system 180.

Using these crowd-sourced operational telemetry measurements from a plurality of client information handling systems (e.g., 150), and CO2 emissions values, the cloud-based CO2 emissions state remediation system 180 executing on a hardware processor 101 in embodiments herein may use a crowd-source trained feed-forward neural network modelling a relationship between changes in CO2 emissions values and changes in client device operational telemetry measurements, including user-adjustable operational telemetry measurements. The trained feed-forward neural network of the CO2 emissions state remediation system 180 is used to identify one or more changes in power measurements, software analytics measurements, or error log events that could cause an individual client information handling system (e.g., 150) to return to the second state from the non-eco-friendly third state. The cloud-based CO2 emissions state remediation system 180 operating at the UEM platform 100 in an embodiment may then transmit remediation user instructions for returning the client information handling system (e.g., 150) to the eco-friendly CO2 emissions state one or two from the non-eco-friendly CO2 emissions state three.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions of the CO2 emissions state remediation system 180, the wireless network interface device 160, a static memory 103 or drive unit 107, a, a video display 109 or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, such as for the CO2 emissions state remediation system 180, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing a CO2 emissions state remediation system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6*e*. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present embodiments encompass software, firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. The information handling system 100 may include a set of instructions 187 that may be executed to cause the computer system to perform any one or more of the methods or computer-based functions disclosed herein, such as predicting, based on operational telemetry measurements from a plurality of client information handling systems (e.g., 150), that replacement of a hardware component or a remediation user instructions for adjusting operations of a client information handling system (e.g., 150) may cause a transition from a current non-eco-friendly CO2 emissions state three to an eco-friendly CO2 emissions state one or two. For example, instructions 187 may include a particular example of a CO2 emissions state remediation system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The CO2 emissions state remediation system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the CO2 emissions state remediation system 180, firmware or software algorithms, processes, and/or methods may be stored here. Such code instructions 187 may comprise predicting and notifying a user when replacement of a hardware component or a remediation user instructions for adjusting operations of a client information handling system (e.g., 150) may cause a transition from a current non-eco-friendly CO2 emissions state three to an eco-friendly CO2 emissions state one or two. The CO2 emissions state remediation system 180 may operate on hardware processing resources within a Unified Endpoint Management (UEM) platform 100 that gathers telemetries from a plurality of client information handling systems (e.g., 150) endpoints via the network 170 that describe operating environments for those client information handling systems (e.g., 150). The UEM platform 100 in an embodiment may operate to identify information technology (IT) issues at client information handling systems 150, and to provide support for such issues, including automatically updating drivers or hardware components, as needed. The UEM platform in an embodiment may operate as a cloud-based service to store data (e.g., operating environment telemetries for remote client information handling systems 150) within memory 102, static memory 103, or computer readable medium 186 received via network 170. In some embodiments the information handling system 100 may be a server executing a UEM platform.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the CO2 emissions state remediation system 180 may be stored in static memory 103, or the drive unit 107 on a computer-readable medium 186 such as a flash memory or magnetic disk in an example embodiment. More specifically, telemetries describing heat measurements, executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may execute software, including firmware embedded at a device, such as an Intel® Core class hardware processor, ARM® brand hardware processors, Qualcomm Snapdragon hardware processors, or other hardware processors and chipsets, or other such device, or software capable of operating a relevant environment of the information handling system. The system, device, controller, or module may also comprise a combination of the foregoing examples of hardware, firmware, or software. In an embodiment an information handling system 150 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

FIG. 2 is a block diagram illustrating a carbon dioxide (CO2) emissions state transition prediction system 280 for determining remediation user instructions to be implemented at a client information handling system 250 to predict replacement user instructions or remediation user instructions to return a client information handling system from a non-eco-friendly CO2 emissions state three to an eco-friendly CO2 emissions state one or two according to an embodiment of the present disclosure. A unified endpoint management (UEM) platform 200 in an embodiment may execute a CO2 emissions state remediation system 280 to predict replacement user instructions or remediation user instructions to return a client information handling system 250 from an unsustainable greenhouse gas emissions state such as state three, under management of or in communication with an enterprise management system 230. The enterprise management system 230 may act as an interface between the client information handling system (e.g., 250 or 270) and the UEM platform 200 to manage return or remediation of a client information handlings system 250 from the unsustainable greenhouse gas emissions state three to an eco-friendly CO2 emissions state one or two.

The UEM platform 200 in an embodiment may operate as a cloud-based service in communication with the enterprise management system 230 via a network to identify information technology (IT) issues at a first client information handling system 250, or a second client information handling system 270. The UEM platform 200 and enterprise management system 230 may also provide support for such issues, including automatically updating drivers or hardware components, as needed. In a specific embodiment of the present disclosure, the UEM platform 200 may gather operational telemetry measurements from a plurality of client information handling systems (e.g., 250 and 270) that describe operating environments for those client information handling systems (e.g., power consumption analytics, failures or errors associated with one or more hardware components, or analytics for software usage).

A CO2 emissions state remediation system 280 in an embodiment may use a crowd-source trained neural network 286 that models a relationship between changes in CO2 emissions values and changes in various operational telemetry measurements, including one or more that may be deemed user-adjustable with adjustments to client information handling system operation. For example, client information handling system operational telemetry measurements such as power analytics, software analytics, or error log events may be used to predict the degree to which certain changes in operational efficiency of client information handling systems (e.g., 250 or 270) may increase or decrease CO2 emitted during such operation. These changes in operational efficiency in an embodiment may be represented by the various operational telemetry measurements as they change, such as changes to power analytics, software application analytics, and event viewer log entries. The UEM platform 200 may receive such operational telemetry measurements upon which such predictions may be made from a plurality of client information handling systems (e.g., 250 and 270), which may be managed by the same enterprise management system (e.g., 230), or may be managed by separate enterprise management systems in various embodiments.

Each client information handling system (e.g., 250 or 270) in an embodiment may include a plurality of hardware components. For example, a first client information handling system 250 in an embodiment may include a network interface device 220, a hardware processor (e.g., central processing unit (CPU), graphics processing unit (GPU), or visual processing unit (VPU)) 242, a display 245, a memory 246, a fan 243, and one or more components of a power supply unit (e.g., battery 244). In some embodiments, the first client information handling system 250 may further include one or more sensing devices, such as a location sensing devices 248 (e.g., GPS location unit), or camera 247, which may also be used during execution of videoconferencing software applications, for example. In another embodiment, the first client information handling system 250 may further be operably connected to one or more peripheral devices, for example. Such an operably connection may employ a driver or firmware for such a peripheral device in such an embodiment. One or more of the other hardware components described herein (e.g., 220, 242, 243, 244, 245, 246, 247, or 248) may further operate according to firmware or driver instructions in an embodiment.

A power analytics module 240 in an embodiment may be in communication with the various hardware components (e.g., 220, 242, 243, 244, 245, 246, 247, or 248) and firmware for those components in an embodiment. For example, the power analytics module 240 may monitor power consumption by each of the various hardware components (e.g., 220, 242, 243, 244, 245, 246, 247, or 248) in an embodiment. In another example embodiment, the power analytics module 240 may also access firmware for hardware components (e.g., 220, 242, 243, 244, 245, 246, 247, or 248) to determine policies or settings for those components at the time of such power measurements. The power analytics module 240, along with the recommendation agent 290 may also receive remediation user instructions to adjust operation of the client information handling system (e.g., 250), pursuant to the CO2 emissions state remediation system 280 determining actions to return the client information handling system 250 to the eco-friendly CO2 emissions state one or two after it has reached an unsustainable greenhouse gas emissions state such as state three.

More specifically, the power analytics module 240 in an embodiment may determine whether a network interface device 220 is transceiving according to WLAN, WWAN, Bluetooth®, Remote Desktop Protocol (RDP), or Near Field Communication (NFC) standards, as well as policies setting a preference for one type of standard over another, or restrictions on operation of the first client information handling system 250 as a mirror server, on allowing remote users to make calls to the hardware processor 242, or on power consumption, data rate, or frequencies used by the network interface device 220. In another example, the power analytics module 240 in an embodiment may determine current usage as a percentage of total capacity for the hardware processor 242 (e.g., central processing unit (CPU), graphics processing unit (GPU), or visual processing unit (VPU)). In still another example, the power analytics module may determine current usage as a percentage of total capacity for memory 246, time required to process requests to access such memory 246, and identify software applications most frequently accessing such memory 246. In yet another example, the power analytics module 240 in an embodiment may determine a usage mode for the display 245, such as day mode, night mode, power reserve mode, or gaming mode (e.g., high-resolution). In still another example embodiment, the power analytics module 240 may determine policies controlling the periods in which sensing hardware may be operational. More specifically, the power analytics module 240 in an embodiment may determine whether the location sensing device (e.g., GPS unit) 248, or camera 247 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 247, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

The power analytics module 240 in an embodiment may also be capable of adjusting such policies within firmware for one or more hardware components, upon user approval. For example, the power analytics module 240 in an embodiment may instruct a network interface device 220 to transceive according to the Bluetooth®, rather than WLAN, WWAN, or in RDP, or reset policies for the network interface device 220 to restrict remote calls, operation as a mirror server, power consumption, data rate, or frequencies used. In another example, the power analytics module 240 in an embodiment may adjust the usage mode for the display 245 to a lower power consumption mode, such as power reserve mode, or lower resolution mode. In still another example embodiment, the power analytics module 240 may decrease the periods in which sensing hardware may be operational, such as restricting such periods to when the first client information handling system 250 is in a closed position, an idle or sleep mode, currently moving, or in startup mode. In yet another embodiment, the power analytics module 240 may adjust the media capture instructions setting for the camera 247 by decreasing a resolution of captured images or a frequency at which those images are captured, or limiting execution of any processing algorithms that may be applied to those images (e.g., zooming, cropping, background image application, boundary recognition, face recognition, smoothing, etc.).

In an embodiment, the power analytics module 240 may also be capable of determining the current versions of drivers for various hardware components (e.g., 220, 242, 243, 244, 245, 246, 247, or 248). In still other embodiments, the power analytics module 240 may further determine power consumed during updates made to various firmware or software applications executing via the hardware processor 242 (e.g., CPU, GPU, or VPU).

As described above, the power analytics module 230 may be in communication with a data collector 261, which may also be in communication with an application analytics module 230. In an embodiment, the application analytics module 230 may monitor and adjust execution of software applications within the operating system (OS) for the first client information handling system 250. The application analytics module 230 in an embodiment may further track which software applications are running or idle (e.g., executing in the background) at various times, and track current versions of software applications and times at which updates to such software applications are performed. In still another example, the application analytics module 230 may determine current usage as a percentage of total capacity for memory 246, time required to process requests to access such memory 246, and identify software applications most frequently accessing such memory 246. In yet another example, the applications analytics module 230 may determine a number of browsing windows engaged in active sessions, and a time of such active engagement. Information gathered by the application analytics module 230 in such an embodiment may be communicated to the data collector 261.

The application analytics module 230 in an embodiment may further direct operation of certain software applications, based on user approval. For example, the application analytics module 230 in an embodiment may cap the percentage of total capacity for the hardware processor 242 or the memory 246 that may be used by specifically identified software applications, or terminate software applications submitting repeated interrupts to the CPU 242 or GPU 246. As another example, the application analytics module 230 in an embodiment may terminate or cap the percentage of total capacity for the hardware processor 242 or memory 246 that may be used by idle or background applications. In yet another example, the application analytics module 230 may cap the amount of time per day that a browsing software application (e.g., Google® Chrome®, Firefox C)) maintains active sessions, or capping a number of active windows within such browsing software applications.

As described herein, the data collector module 261 in an embodiment may gather data regarding hardware configuration and power consumption from the power analytics module 240 and data regarding software performance and hardware processor/memory usage from the application analytics module 230. In some embodiments, the data collector may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error. Such WHEA events may be associated with data packets that specifically identify the hardware component (e.g., 220, 242, 243, 244, 245, 246, 247, or 248) producing the error. The data collector 261 may routinely collect information from each of the power analytics module 240, the application analytics module 230 or the event viewer 265 at preset intervals, or may do so upon notification by one of these modules (e.g., 230, 240, or 265) of a specific event, failure, or warning.

Information recorded by the event viewer 265 in an embodiment may be output in the form of a log, while information recorded by the power analytics module 240 or the application analytics module 230 may be output into reports. The format of such a log or report may vary, which may require reformatting of such information into an easily classified, sorted, and searchable format. Thus, the data collector 261 in an embodiment may operate to reformat any received logs or reports into a predetermined data interchange format such as JavaScript Object Notation (JSON), of Extensive Markup Language (XML). Specific examples described herein may use the JSON format for consistency and ease of explanation, but any other type of existing or later developed predetermined data interchange format agreed upon between data sinks and sources may be used in various embodiments.

The data collector 261 in an embodiment may transmit information received at any given time from the power analytics module 240, application analytics module 230, or event viewer 265) and reformatted to a predetermined data interchange format (e.g., JSON) to a data classifier 262. Such a JSON-formatted report or log may be referred to herein as a JSON event. Each JSON event may include any information gathered from the power analytics module 240, application analytics module 230, or event viewer 265 and a time stamp associated with either the time the analytics module report was generated, or the time at which a WHEA (or other known convention for categorizing processing events) error occurred. In some cases, a JSON event may include a single WHEA error (e.g., hardware processor error), or a single notification or warning from an analytics module (e.g., failure of a hardware component such as the fan 243). In other cases, a JSON event may include routinely gathered information such as current configurations or policies for various hardware components (e.g., 220, 242, 243, 244, 245, 246, 247, or 248) or software applications, power consumption of those components over a known monitoring time period, current versions of drivers or software applications, and timestamps for installation of updates to such drivers or software applications. Such information may be illustrated by the following table:

TABLE 1

| | |
|---|---|
| Timestamp | 1544145450 |
| Client Device ID | 456789 |
| Event ID | 123460 |
| Errors, notifications, warnings | WHEA error: Fan<br>Fan operating at 60 W<br>Fan workload at 90% |

TABLE 1-continued

| | |
|---|---|
| | Gaming application initialization Unsuccessful<br>Gaming application using 90% GPU<br>Background applications using 90% memory<br>Browsing application using 90% network interface device resources |
| Location | Paris, France |
| Model | Laptop 7400 |
| Hardware Configuration | WLAN network interface device;<br>WWAN network interface device;<br>Bluetooth ® network interface device;<br>16 GB memory;<br>X series CPU;<br>G Series GPU;<br>256 GB Solid State Drive (SSD);<br>15.6 inch full high definition (HD) organic light emitting diode (OLED) display;<br>Fan driver version 14.2;<br>Webcam Camera type; |
| Hardware Performance | WWAN Interface Device transceived 100 GB;<br>Battery efficiency 59%;<br>Display in High Definition Mode;<br>Motion Detector Set to Continuous Monitor;<br>Camera in High Resolution Mode;<br>System used 15 hours per day;<br>120 Watts total power consumption per day; |
| Software Performance | Operating System 10.2;<br>Browsing application active eight hours per day; |

Some or all of the information displayed above within TABLE 1 may be formatted as a JSON incident in an embodiment. Each row of the above table may be formatted as one or more JSON events within the JSON incident in an embodiment. A JSON incident may include a data node identifying an event ID, a source for the event (e.g., power analytics module 240, applications analytics module 230, or event viewer 265), a timestamp for that event, one or more custom flags identifying the errors, notifications, or warnings, and one or more device current states, identifying the software and hardware configurations. Any one of the rows of the JSON incident illustrated directly below may represent a JSON event. For example, such a data node depicting information from TABLE 1, above, may appear in a JSON incident as:

```
{
  "data" :
  {
    "event_id" : 123460,
    "source_ID" : power_analytics_module,
    "timestamp_unixtime_ms" : 1544145450,
    "custom_flags" :
      {
        "WHEA_error" : fan,
        "fan_workload" : 0.90,
        "Unsuccessful_initialization_attempt" : gaming_app,
        "gaming_application_GPU_usage" : 0.9,
        "background_application_memory_usage" : 0.9,
        "browsing_application_NID_usage" : 0.9,
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "fan_driver_version" : 14.2,
```

-continued

```
        "Display_mode" : high_definition,
        "Camera_type" : webcam,
        "Camera_detection_mode" : continuous_monitor,
        "Camera_capture_mode" : high_resolution,
        "OS_Version" : 10.2,
        "efficiency_battery" : 0.59,
        "usage_time_hours_perday" : 15,
        "fan_power_consumption_watts" : 60,
        "total_power_consumption_watts_perday" : 120,
        "active_browsing_hours_perday" : 15;
      }
}
```

The example given above in TABLE 1 and the corresponding above JSON incident may further include any number of other errors, notifications, or warnings, hardware configurations, software performance analytics, or descriptions of policies in place for hardware or software at the client information handling system 250, as monitored by either the power analytics module 240 or the application analytics module 230. Some JSON events in an embodiment may indicate a hardware failure, such as a JSON event named "WHEA error," having a value of fan, indicating a failure at the fan. In embodiments where a JSON event indicating a hardware error identifying by the systems internal health assessor (as described below and with respect to FIG. 4) appear, the JSON incident may comprise one or more operational telemetry measurements for an information handling system. Upon reformatting of information in an embodiment, the data collector 261 may transmit the JSON incident comprising the operational telemetry measurements to the data classifier 262. In an embodiment, the data classifier 262 may operate to analyze the contents of the JSON incident comprising the operational telemetry measurements, to classify the type of JSON events included therewithin, and to edit the JSON incident to generate a second JSON incident that includes that classification type.

Classification types may be preset according to instructions received by the recommendation agent 290 from the communication agent 281. Such classification types may assist the communication agent 281 and systems internal health assessor 283 in determining when a hardware failure impacting CO2 emissions state for the client information handling system 250 has occurred, or will occur in the immediate future, as described in greater detail below. In example embodiments, classification types, such as software resource use, hardware configuration, or driver performance, may be preset and available for use in classifying JSON incidents received from the data collector 261.

Incident classifications in an embodiment may be associated with one or more previously identified event values. For example, an incident classification for "workload," identifying relatively high workloads that may result in various hardware component failures in an embodiment may be associated by the CO2 emissions state remediation system 280 with JSON events titled "fan_workload" having a value exceeding 85%. In another example, an incident classification for "Config," identifying a hardware configuration or policy that may result in various hardware component failures in an embodiment may be associated with JSON events titled "Config," having a value such as "active_browsing_hours_perday" having a value above 10, "server_mirroring" having a value "ON," "remote_desktop_protocol" having a value "ON," "remote_processor_calls" having a value "ALLOW," "full_power_mode" (e.g., indicating full power supplied to the monitor), "active_sensing_mode"

(e.g., indicating sensing hardware components set to remain on), "High_Definition_Mode" (e.g., indicating GPU or monitor set to display in high definition). In yet another example, an incident classification for "app_usage," identifying relatively intensive usage of software applications that may result in various hardware component failures in an embodiment may be associated with JSON events titled "App_usage" having a value exceeding 85%. In still another example, an incident classification for "driver_performance," identifying poor or inefficient driver performance (e.g., as indicated by a percentage of calls to that driver resulting in an error over a preset time period) that may result in various hardware component failures in an embodiment may be associated with JSON events titled "driver_perf" having a value exceeding 50%. In yet another example, an incident classification for "background_usage," identifying relatively intensive usage of software applications operating in idle mode or in the background that may result in various hardware component failures in an embodiment may be associated with JSON events titled "background_usage" having a value exceeding 85%. Any numerical or percentage maximum application usage threshold values preset as described directly above may be set to any number between one and one hundred in various embodiments described herein.

In an example embodiment, the data classifier 262 in an embodiment may analyze the JSON incident comprising operational telemetry measurements described above to identify whether any of the JSON events and values associated with preset incident classifiers appear within the JSON incident. For example, the data classifier 262 in an embodiment may determine the JSON incident comprising operational telemetry measurements described above includes the JSON event named "fan_workload," having a value of 0.90, or 90%, which is greater than the preset maximum fan workload of 85%. In such an embodiment, the data classifier 262 may determine these JSON events are associated with the preset incident classifier "workload," and may append this classification to the end of the JSON incident comprising operational telemetry measurements to generate a classified JSON incident comprising operational telemetry measurements:

```
{
  "incident_class" : Workload,
}
```

In other embodiments in which the data classifier 262 identifies a JSON event "fan_driver_install_time_mins" having a value greater than 60 minutes, or some other preset maximum installation time, or a JSON event "unsuccessful_driver_install_attempts," the data classifier 262 may determine these JSON events and values are associated with the preset incident classifier "driver_perf." In another aspect of such embodiments, the data classifier 262 may identify JSON events such as "active_browsing_hours_perday" having a value above 10, "server_mirroring" having a value "ON," "remote_desktop_protocol" having a value "ON," "remote_processor_calls" having a value "ALLOW." The data classifier 262 in such an embodiment may associate any of these JSON events and values with the classification "Config," and append these classifications to the JSON incident to generate a classified JSON incident comprising operational telemetry measurements such as:

```
}
  "incident_class" : Workload,
  "incident_class" : Driver_perf,
  "incident_class" : Config,
}
```

The classified JSON incident comprising operational telemetry in an embodiment may be transmitted to the device index mapper 263, which may operate to associate the classified JSON incident with a device ID and device model for the first client information handling system 250. Such a device ID in an embodiment may be one of several device IDs for a plurality of information handling systems (e.g., including the first and second client information handling systems 250 and 270) stored at the UEM platform 200. In some embodiments, the device index mapper 263 may also retrieve a location for the first client information handling system 250 from the location mapper 264 or the GPS unit 248. In some cases, the location mapper 264 may represent the location of the first client information handling system 250 with reference to its location within a campus of an enterprise. More specifically, the first client information handling system 250 may be located on a specific floor of a specific building. The device index mapper 263 in an embodiment may then edit the classified JSON incident comprising operational telemetry measurements to generate an indexed and classified JSON incident comprising operational telemetry measurements that includes this information, such as shown directly below, which is then transmitted to the recommendation agent 290:

```
{
  "data" :
  {
    "event_id" : 123460,
    "source_ID" : power_analytics_module,
    "timestamp_unixtime_ms" : 1544145450,
    "client_device_ID" : 456789,
    "client_device_model" : Laptop_7400,
    "location" : Paris_France,
    "custom_flags" :
      {
        "WHEA_error" : fan,
        "fan_workload" : 0.90,
        "Unsuccessful_initialization_attempt" : gaming_app,
        "gaming_application_GPU_usage" : 0.9,
        "background_application_memory_usage" : 0.9,
        "browsing_application_NID_usage" : 0.9,
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "fan_driver_version" : 14.2,
        "Display_mode" : high_definition,
        "Camera_type" : webcam,
        "Camera_detection_mode" : continuous_monitor,
        "Camera_capture_mode" : high_resolution,
        "OS_Version" : 10.2,
        "efficiency_battery" : 0.59,
        "usage_time_hours_perday" : 15,
        "fan_power_consumption_watts" : 60,
        "total_power_consumption_watts_perday" : 120,
        "active_browsing_hours_perday" : 15;
      }
```

-continued

```
  }
  "incident_class" : Workload,
}
```

The recommendation agent 290 in an embodiment may determine a CO2 emissions value for the client information handling system 250 based on the classified and indexed JSON incident received from the device index mapper 263. This CO2 emissions value determination may be made based on the location of the device, the power consumed by each of the hardware components, the usage time for such power consumption, and the efficiency of the battery, as shown in the indexed and classified JSON incident.

The location of the client information handling system may define an estimated amount of CO2 (in pounds per kWh) emitted during generation of the power consumed by the client information handling system. Carbon footprint for a client information handling system (e.g., 250 or 270) in an embodiment may be based on the power consumed by the client information handling system (e.g., 250 or 270), the duration of such consumption, and a location CO2 emissions rate describing the amount of CO2 or other GHGs emitted during generation of each Watt of power consumed by the client information handling system (e.g., 250 or 270). In embodiments, the recommendation agent 290 may communicate with the CO2 optimization engine 285 or telemetry 282 to determine such a location CO2 emissions rate for the client information handling systems 250 based on the location given within an indexed and classified JSON incident (e.g., as shown directly above) and stored in telemetry 282. For example, the recommendation agent 290 may communicate with the CO2 optimization engine 285 or telemetry 282 to determine the location CO2 emissions rate describing the amount of CO2 of other GHGs emitted during generation of each Watt of power consumed by the client information handling system 250 in Paris, France (e.g., the location of the client information handling system 250 as shown in the indexed and classified JSON incident) to be 0.136 pounds CO2 per kWh.

In an example embodiment when the client information handling system 250 has just been initially operated (and is thus assumed to be operating at peak efficiency), the CO2 emissions value may be determined using the equation below to determine the CO2 emissions value for the client information handling system 250 operating in Paris, France, where the location CO2 emissions rate is 0.136 pounds CO2 per kWh, the power consumed is 120 Watts over a usage time of 15 hours at a battery efficiency of 59% is equivalent to 0.415 pounds CO2 per day:

$$\text{CO2 Emissions Value} = \frac{\text{location CO2 emissions rate} * \text{Power Consumed} * \text{Usage Time}}{\text{Battery Efficiency}}$$

The recommendation agent in an embodiment may perform this determination of CO2 emissions value for each indexed and classified JSON incident it receives from the device index mapper 263 over the CO2 emissions state determination training period. Following such a determination, the recommendation agent 290 may append one or more JSON events indicating the CO2 emissions value within the indexed and classified JSON incident most recently received from the device index mapper 263 and upon which such a determination was made.

As described herein, the recommendation agent 290 executing on hardware processing resources at a client information handling system 250 in an embodiment may set goals for capping CO2 emissions due to operation of the client information handling system 250 that takes the age of the device and its components into account. In an embodiment, the life cycle of each client information handling system (e.g., 250) may be divided into three states. These states include a first, peak-health training state, immediately following initial purchase and use of the device, a monitoring second state in which the client information handling system consistently meets the goal for capping CO2 emissions, and a non-eco-friendly third state in which inefficient operation of the device unrelated to age causes the client information handling system to fail to meet that goal. Each of the threshold CO2 emissions values defining these states may be unique to each client information handling system and may be established to take into account the age of each device. For example, the first state may be defined by a maximum value of pounds of CO2 emitted per hour measured during a preset three or six month period following initial operation of the client information handling system (e.g., 250). During this first state, it is assumed that the client information handling system (e.g., 250) is working at peak efficiency. In other words, it is assumed that the client information handling system (e.g., 250) is not experiencing efficiency loss due to age or due to inefficient use of the device. For example, in an embodiment in which the recommendation agent 290 uses the indexed and classified JSON incident shown above to determine the maximum recorded CO2 emissions value during the training period, the recommendation agent 290 may define the maximum CO2 emissions value for the training period to be 0.091 pounds CO2 per day. This first state threshold maximum value of pounds of CO2 emitted per hour may provide an initial benchmark against which future efficiency of the client information handling system (e.g., 250) may be measured.

As described above, some decrease in operational efficiency at each client information handling system is unavoidable due to wear and tear of components, such as, for example, the battery. Thus, the CO2 emitted per hour is expected to increase over time to an adjustable benchmark, even when the client device (e.g., 250) is being used as efficiently as possible, due to decreased efficiency of the battery as it ages. In other words, even if the updating and execution of software and firmware and power consumption of various components (e.g., 220, 242, 243, 244, 245, 246, 247, or 248) are optimized for minimizing CO2 emissions, increases in CO2 emissions during operation of the client information handling system (e.g., 250) will still occur. The recommendation agent 290 in an embodiment may differentiate such unavoidable increases in CO2 emissions due to aging from further increases in CO2 emissions due to avoidable inefficient usage of the client information handling system 250 (e.g., due to failure to perform updates, non-optimized execution of software or firmware, or non-eco-friendly power consumption by hardware components).

The recommendation agent 290 may determine a minimum allowable battery efficiency prior to prompting replacement of the battery 244 in an embodiment. These values may be used below to define the boundary between CO2 emissions state two and state three. The recommendation agent 290 in an example embodiment may define this minimum allowable battery efficiency at 25%. In such an example embodiment, the recommendation agent 290 anticipates that the battery efficiency may degrade down to 25% before the battery 244 will be replaced.

The recommendation agent 290 in an embodiment may determine a CO2 emissions state three transition threshold value based on the state two transition threshold value and a minimum allowable battery efficiency. The recommendation agent 290 may determine a minimum allowable battery efficiency prior to prompting replacement of the battery 244 in an embodiment. These values may be used below to define the boundary between CO2 emissions state two and state three. As described herein, some decrease in operational efficiency at each client information handling system (e.g., 250) is unavoidable due to wear and tear of components, such as, for example, the battery 244. Thus, the CO2 emitted per hour is expected to increase over time, even when the client device 250 is being used as efficiently as possible, due to decreased efficiency of the battery 244 as it ages. The CO2 emissions state transition determination system 290 in an embodiment differentiates such unavoidable increases in CO2 emissions due to aging from further increases in CO2 emissions due to avoidable inefficient usage of the client information handling system 250 (e.g., due to failure to perform updates, non-optimized execution of software or firmware, or non-eco-friendly power consumption by hardware components). For example, the recommendation agent 290 in an embodiment may determine a CO2 emissions state three transition threshold value by dividing the CO2 emissions state two transition threshold by the minimum allowable battery efficiency. This maximum CO2 emissions value defining the second state in embodiments may be referred to herein as a non-eco-friendly state transition threshold value. When operation of the client information handling system 250 causes emission of CO2 beyond this non-eco-friendly state transition threshold value, the client information handling system 250 may pass from the second state to the third, non-eco-friendly CO2 emissions state in which inefficient operation of the device unrelated to age causes increased CO2 emissions. In such a way, the recommendation agent 290 may estimate CO2 emissions for optimally efficient usage of the client information handling system 250 in state two, given the unavoidable drop in efficiency of its battery.

The recommendation agent 290 may initiate a CO2 emissions state monitoring period following determination of the CO2 emissions states two and three transition threshold values described directly above. During this monitoring period, the recommendation agent 290 may routinely generate CO2 determined monitoring period JSON incidents (similarly to the method used to generate a CO2 determined training period JSON incident described below with respect to FIG. 3) during a routine period of monitoring, and append the determined CO2 emissions value, CO2 emissions state two transition threshold value, and CO2 emissions state three transition threshold value to generate CO2 state monitoring period JSON incidents.

A data segregator 266 of the client information handling system 250 in an example embodiment may determine whether the client information handling system is operating within the non-eco-friendly CO2 emissions state three and may include a usage profile for the client information handling system 250 within the CO2 state monitoring period JSON incident during each monitoring period described directly above. The data segregator 266 in an embodiment may operate to narrow the number of CO2 state monitoring period JSON incidents transmitted to the CO2 emissions state remediation system 280 at the Unified Endpoint Management (UEM) platform 200 and to assist the CO2 emissions state remediation system 280 in sorting CO2 state monitoring period JSON incidents according to usage profiles.

As described herein, execution of code instructions for the CO2 emissions state remediation system 280 via hardware processing resources in an embodiment may remediate client information handling systems (e.g., 250) currently operating in the non-eco-friendly CO2 emissions state three (non-eco-friendly state). Because the CO2 emissions state remediation system 280 in such an embodiment only analyzes performance of client information handling systems (e.g., 250 or 270) currently operating within the non-eco-friendly CO2 emissions third state, only CO2 state monitoring period JSON incidents from those information handling systems (e.g., 250 or 270) currently operating in the CO2 emissions third state need be transmitted to the CO2 emissions state remediation system 280.

As also described herein, in some embodiments, a separate neural network may be trained for each usage profile identified by the data segregator 266 within the CO2 state monitoring period JSON incidents for the plurality of client information handling systems. For example, such usage profiles may specify the type of activities for which the client information handling system (e.g., 250 or 270) has been purchased. More specifically, example usage profiles may identify the client information handling system 250 as a corporate device used primarily for presentations, accounting, or enterprise-wide communications, or as a testing device used for operational testing of various peripherals or hardware components. In another example, usage profiles may identify the client information handling system 250 as a code-compiling or software application development machine, a device used primarily as a home computer or personal computer, or a device intended for use as a gaming platform. In an example embodiment, this information may be determined based on user input via a GUI during initial startup of the client information handling system (e.g., 250) following its purchase. The data segregator 266 in an example embodiment may include a JSON event named "usage profile" having a value of "corporate," or any of the other above-described usage profiles or other contemplated usage profiles within the CO2 state monitoring period JSON incident. Any client usage profile categories may be utilized for various client information handling systems monitored by the UEM platform such that those with similar usage profiles may be used as inputs and as a basis for comparison. These CO2 state monitoring period JSON incidents may then be transmitted to the CO2 state transition prediction system 280 of the UEM platform 200.

The CO2 state transition prediction system 280 in an embodiment may operate to remediate client information handling systems (e.g., 250) currently operating in the non-eco-friendly CO2 emissions state three, also referred to as an unsustainable greenhouse gas emissions three). As described herein, a cloud-based CO2 emissions state remediation system 280 may predict whether replacement of a failed hardware component, alone or in combination with a remediation user instruction to alter operation of the client information handling system 250 may effectively return the client information handling system from the non-eco-friendly CO2 emissions state three to an eco-friendly CO2 emissions state one or two.

The communication agent 281 operating at the UEM platform 200 in an embodiment may receive and store in telemetry CO2 state monitoring period JSON incidents from a plurality of client information handling systems (e.g., 250 and 270) over a plurality of monitoring periods. In some embodiments, a systems internal health assessor (SIHA) 283 operating at the Unified Endpoint Management (UEM) platform 200 may identify one or more CO2 state monitoring period JSON incidents indicating hardware failure. For example, the SIHA 283 operating at the UEM platform 200 in an embodiment may identify one or more CO2 state monitoring period JSON incidents received from the client information handling system (e.g., 250 or 270) indicating hardware failure at those devices.

The SIHA 283 of the UEM platform 200 in an embodiment may identify a CO2 state monitoring period JSON incident as indicating failure of a hardware component of a given hardware type, or indicating another substantial functional inefficiency. For example, the SIHA 283 in an embodiment may search a CO2 state monitoring period JSON incident which has been transmitted to the communication agent 281 and stored in telemetry 282 for JSON events named "WHEA Error," indicating an error, such as a substantial inefficiency in the function of an identified hardware component (e.g., 220, 242, 243, 244, 245, 246, 247, or 248). Upon identification of such an error, alone or as part of a sequence of errors, associated with an identified hardware component (e.g., 220, 242, 243, 244, 245, 246, 247, or 248), the SIHA 283 may transmit a notification to the communication agent 281 that the CO2 state monitoring period JSON incident (e.g., identified by event id given within the CO2 state monitoring period JSON incident), or sequence of JSON incidents indicates poor health of a hardware component.

In another aspect, the telemetry 282 may also comprise failed operational telemetry including results of benchmark testing performed at the power analytics modules (e.g., 240) of each of a plurality of information handling systems (e.g., 250 and 270) transmitting analytics and event logs to the UEM platform 200, in an embodiment. As described herein, the power analytics module 240 may test the performance of one or more hardware components by executing sample tasks similar to tasks performed by those devices routinely. The power analytics module 240 may assign a test benchmark score for each tested hardware component (e.g., 246), based on the speed and accuracy with which each component completes these basic tasks.

The systems internal health assessor (SIHA) 283 in an embodiment may search telemetry 282 data to identify indications within received application analytics, power analytics, or event viewer logs translated into CO2 state monitoring period JSON incidents of hardware failures, errors, or underperformance or sequences of the same at reporting client information handling systems (e.g., 250 or 270). In other embodiments, the SIHA 283 may determine that a component is failing if one or more CO2 state monitoring period JSON incidents for the information handling system (e.g., 250) using that hardware component (e.g., 242) include a number of errors for that component (e.g., 242) that meets or exceeds a maximum error threshold (e.g., numbers of errors at 100, 50, 10, 5) within a preset period of time (e.g., 24 hours) and which may be alone or in combination with a sequence of errors. These are only example maximum error threshold values and preset time period values, and any values for these thresholds are contemplated herein.

As another example, the SIHA 283 may determine that a component is failing if one or more CO2 state monitoring period JSON incidents for the information handling system (e.g., 250) indicate a test benchmark score for that component (e.g., 242) that falls below a preset minimum benchmark threshold value (e.g., 85% of average crowd-sourced benchmark value) alone or as port of a sequence of errors or reported issues. As described above, the telemetry 282 may store results of benchmark testing performed at the power analytics modules (e.g., 240) of each of a plurality of information handling systems (e.g., 250 and 270) testing the performance of one or more hardware components by executing sample tasks similar to tasks performed by those devices routinely. For each hardware component type (e.g., CPU, GPU, memory, network interface device, etc.), the SIHA 283 in an embodiment may determine the average test benchmark value across a plurality of information handling systems (e.g., 250 and 270), against which test benchmark values for individual components (e.g., 242, 246, 220) may be compared in order to determine whether such an individual component is underperforming or failing. For example, the SIHA 283 may determine that the memory 246 of the first information handling system 250 is failing in an embodiment in which the test benchmark score for that memory 246, as indicated within power analytics or application analytics stored in telemetry 282 is less than a preset minimum percentage of the average test benchmark score (e.g., 85%) for all similar memory devices (e.g., computer hard drives) in the plurality of other information handling systems (e.g., including 270) reporting to the UEM platform 200. This preset minimum percentage is just an example, and other values are contemplated. Further, preset minimum percentage may be defined on a component by component basis. In other words, the preset minimum percentage for determining whether a memory is failing may be 85%, while the preset minimum percentage for determining whether a hardware processor is failing may be 90%, for example.

Upon identification of a failed hardware component (e.g., fan 243) at a client information handling system (e.g., 250) operating in the non-eco-friendly CO2 emissions state three, the CO2 emissions state remediation system 280 may determine whether replacement of the failed hardware component, alone or in combination with a remediation user instruction to also alter the operation of the client information handling system may return the client information handling system to the eco-friendly CO2 emissions state one or two. The CO2 emissions state remediation system 280 in an embodiment may employ a neural network 286 to first predict whether such replacement of the failed hardware component alone may return the client information handling system 250 to the eco-friendly CO2 emissions state one or two.

The neural network 286 operating at the UEM platform 200 may model a relationship between each of a plurality of user-adjustable operational telemetry measurement values indicated within a first-recorded CO2 state monitoring period JSON incident and the CO2 emissions state indicated within a second, later-recorded CO2 state monitoring period JSON incident. The CO2 emissions state remediation system 280 in an embodiment may receive and input into such a trained neural network 286 a CO2 state monitoring period JSON incident from a first client information handling system (e.g., 250) to predict the CO2 emissions value or CO2 emissions state for the current monitoring period, based on the input of the CO2 state monitoring period JSON incident generated during the previous monitoring period.

The neural network 286 in an embodiment may be crowd-source trained on other sets of received CO2 state monitoring period JSON incidents from a plurality of client information handling systems (e.g., 250 and 270) using the same frequency of monitoring periods as that used by the information handling system 250. Further, in some embodiments, a separate neural network (e.g., 286) may be trained for each of a plurality of usage profiles for the plurality of client information handling systems. For example, such usage profiles may specify the type of activities for which the client information handling system (e.g., 250 or 270) has been purchased. More specifically, example usage profiles may identify the client information handling system 250 as a corporate device used primarily for presentations, accounting, or enterprise-wide communications, or as a testing device used for operational testing of various peripherals or hardware components. In another example, usage profiles may identify the client information handling system 250 as a code-compiling or software application development machine, a device used primarily as a home computer or personal computer, or a device intended for use as a gaming platform. In an example embodiment, this information may be determined based on user input via a GUI during initial startup of the client information handling system (e.g., 250) following its purchase. The data segregator 266 in an example embodiment may include a JSON event named "usage profile" having a value of "corporate," or any of the other above-described usage profiles or other contemplated usage profiles within the CO2 state monitoring period JSON incident. In an embodiment in which the client information handling system is associated with a usage profile, the recommendation agent 290 may also include the usage profile within the CO2 determined JSON incident generated at block 322 to create a CO2 state monitoring period JSON incident. The recommendation agent 290 in such an embodiment may then transmit the CO2 state monitoring period JSON incident to the CO2 emissions state remediation system 280 at the UEM platform 200.

The CO2 emissions state remediation system 280 in an embodiment may receive and input into the crowd-source trained neural network 286 an edited CO2 state monitoring period JSON incident from a first client information handling system (e.g., 250) in order to predict whether replacement of the failed hardware component identified by the SIHA 283 may return the client information handling system (e.g., 250) to the eco-friendly CO2 emissions state one or two. As described in greater detail below with respect to FIG. 4, such an edited CO2 state monitoring period JSON incident may remove any JSON events indicating failure of the hardware component or relied upon by the SIHA 283 for the determination of hardware failure. In addition, the edited CO2 state monitoring period JSON incident input into the neural network 286 may include an optimal power consumption associated with an identified replacement part. Such an optimal power consumption value in an embodiment may be established through communication with the component hub 231 of the enterprise management system 230.

In an embodiment, the component hub 231 may track all replacement hardware components that may be installed at any client information handling system (e.g., 250 or 270) within the enterprise system. Such a hub may also maintain specifications on each of the available replacement parts, including compatibility with certain client information handling systems (e.g., 250 or 270), status as new or refurbished, and various operational parameters, including optimal power consumption estimations. For example, such a hub may track the location of a new fan that is available for replacing the fan 243 that has an optimal power consumption of 20 Watts and is compatible with the client information handling system 250. In another example, the hub may track the location of a refurbished fan that may be replaced in another client information handling system with higher performance required of it that will be available for replacing the fan 243 that has an optimal power consumption of 20 Watts and is compatible with the client information handling system 250 and may include tracked operational telemetry data about its performance.

The execution of code instructions of the CO2 emissions state remediation system in an embodiment may be used to determine whether the output from the neural network indicates that replacement of the failed hardware component (e.g., fan 243) alone may return the client information handling system (e.g., 250) to the eco-friendly CO2 emissions state one or two based on the input of the edited CO2 state monitoring period JSON incident. If the neural network output indicates such a remediation back to the eco-friendly CO2 emissions state one or two, this may indicate no need for further steps to return from the current non-eco-friendly CO2 emissions state three. If the neural network output indicates that the client information handling system (e.g., 250) may remain in the non-eco-friendly CO2 emissions state three, even after the failed hardware component (e.g., fan 243) has been replaced, this may indicate a need for further remediation user instructions to alter the operation of the client information handling system (e.g., 250), in addition to replacement of the failed hardware component (e.g., fan 243).

The CO2 emissions state remediation system 280 in an embodiment may identify one or more remediation user instructions that, in combination with replacement of the failed component (e.g., fan 243) may effectively return the client information handling system (e.g., 250) to the eco-friendly CO2 emissions state one or two, as described in greater detail below with respect to FIG. 5. The CO2 emissions state remediation system 280 in an embodiment in which a remediation user instruction is predicted to move the client information handling system (e.g., 250) to state two or below, when implemented in combination with replacement of the failed hardware component (e.g., fan 243) may transmit such an identified remediation user instruction to the client information handling system for display via a graphical user interface (GUI) 291. The user may then choose whether to implement one or more of the recommended remediation user instructions.

Upon selection by the user of the remediation user instruction for implementation at the client information handling system 250, the recommendation agent 291 may coordinate with the power analytics module 240 and software application analytics module 230 to execute the remediation user instruction identified within the recommendation JSON incident associated with the user accepted recommendation. For example, the user in an embodiment may have accepted a recommendation which provides a remediation user instruction to cap GPU resources made available to the gaming application at 85%. In such an embodiment, the software application analytics module 230 may execute such an instruction to cap the GPU 242 resources made available to the gaming application at 85%. By decreasing the amount of GPU 242 resources made available to the gaming application in such a way, the user of the client information handling system 250 may effectively avoid increased wear and tear on the new replacement part for the failed fan 283, ensuring a return of the client information handling system 250 to the eco-friendly CO2 emissions state one or two.

The CO2 emissions state remediation system 280 in an embodiment may also transmit an instruction to the component hub 231 of the enterprise management system 230 to ship a new replacement part to the information handling system 250. In an embodiment in which the CO2 emissions state remediation system predicts replacement of the failing hardware component (e.g., fan 243), alone or in combination with a remediation user instruction may return the client information handling system 250 to the eco-friendly CO2 emissions state one or two, the CO2 emissions state remediation system 280 may communicate with the component hub 231 to order the new replacement part. For example, the CO2 emissions state remediation system 280 may identify a plurality of replacement parts that are compatible with the client information handling system 250 and check the hub 231 to identify one of the plurality of replacement parts that is located closest to the client information handling system 250. In an embodiment, the CO2 emissions state remediation system 280 may then instruct the component hub 231 to prepare that component replacement part for shipping to the known location of the client information handling system 250 (e.g., Paris, France), which may be identified within the most recently received JSON state monitoring period incident. The CO2 emissions state remediation system 280 may further determine the CO2 cost of shipment for one or more replacement parts as part of the carbon footprint determination of returning the client information handling system to an eco-friendly operation state one or state two in some embodiments. In such a way, the CO2 emissions state remediation system 280 may automate shipment of the nearest compatible replacement part, such as within an enterprise community of managed client information handling system, while minimizing the carbon footprint of such transportation.

The CO2 emissions state remediation system 280 in an embodiment may also transmit an instruction to the client information handling system 250 user to install the new replacement part received from the enterprise management system 230. During communication with the component hub 231, as described directly above, the CO2 emissions state remediation system 280 in an embodiment may receive identification of the replacement part (e.g., new fan) that will be shipped to the client information handling system 250. More specifically, the CO2 emissions state remediation system 280 may receive a bar code, stock keeping unit (SKU) number, other type of serial number, or QR code capable of identifying the replacement part. The CO2 emissions state remediation system 280 in such an embodiment may then transmit an instruction to the client information handling system 250 to install the component device that matches one or more of those identifiers upon receipt of the part at the location of the client information handling system 250. Such instructions may be transmitted to the client information handling system 250 for display via the GUI 291, or through various other mechanisms, including e-mail. These instructions may also be included within the ordered shipment from the component hub 231 to the client information handling system 250, along with the replacement part. In such a way, the CO2 emissions state remediation system may orchestrate replacement of failed hardware components across an enterprise network and provide any additional remediation user instructions for adjustments to the operation of a client information handling system necessary to return the client information handling system to an eco-friendly CO2 emissions state one or two.

FIG. 3 is a flow diagram illustrating a method of gathering power and application analytics for predicting a hardware component failure, a replacement user instruction, and a remediation user instruction to return an information handling system to an eco-friendly CO2 emissions state one or two according to an embodiment of the present disclosure. As described herein, a recommendation agent in various embodiments may determine a first, optimal efficiency CO2 emissions state, a second monitoring period CO2 emissions state, and a third non-eco-friendly CO2 emissions state for an information handling system based on gathered operational telemetry measurements for the information handling system over a training period. As also described herein, a CO2 emissions state remediation system in various embodiments may use a neural network trained on crowd-sourced operational telemetry measurements from a plurality of client information handling systems to model a relationship between operational telemetry measurements and CO2 emissions states. FIG. 3 describes the method of gathering these operational telemetry measurements from a plurality of client information handling systems in the form of JSON incidents in an example embodiment.

At block 302, a user of the client information handling system or IT professional within an enterprise management system in an embodiment may set a monitoring period for monitoring CO2 emissions states at the information handling system. For example, in an embodiment described with reference to FIG. 2, the data collector 261 in an embodiment may gather data regarding hardware configuration and power consumption from the power analytics module 240 and data regarding software performance and hardware processor usage from the application analytics module 230 at preset intervals. For example, such a preset interval may be set to a default monitoring period value (e.g., one hour, one day, one week, one month, or other), or may be set by the user of the first client information handling system 200 via the graphical user interface (GUI) 290.

A location tracking in an embodiment may identify a geographic location for the client information handling system over the user-specified monitoring period at block 304. For example, the location sensing unit 248 in an embodiment may determine a geographic location (e.g., zip code, GPS coordinates, city, state, country) in which the first client information handling system 250 is operating.

At block 306, the power analytics module may track power consumption of multiple hardware components in the client information handling system in an embodiment. For example, the power analytics module 240 in an embodiment may monitor power consumption by each of the various hardware components (e.g., 220, 242, 243, 244, 245, 246, 247, or 248) in an embodiment. In some embodiments, such hardware power consumption may be attributed to specific software applications. For example, the power analytics module 240 in an embodiment may determine current usage of hardware processing resources by software applications as a percentage of total capacity for the hardware processor 242 (e.g., central processing unit (CPU), graphics processing unit (GPU), or visual processing unit (VPU)). In still another example, the power analytics module may determine current usage of memory resources by software applications as a percentage of total capacity for memory 246, time required to process requests to access such memory 246, and identify software applications most frequently accessing such memory 246. In yet another example, the power analytics module 240 in an embodiment may determine a current usage of the display by software applications as a percentage of display time in which GUI for a specific software application is visible, and a usage mode for the display 245, such as day mode, night mode, power reserve mode, or gaming mode (e.g., high-resolution). In another example, the power analytics module 240 in an embodiment may determine current usage of network interface device resources by software applications as a percentage of total capacity for the network interface device 220 to transceive data (e.g., percentage of total available throughput used). All information accessed in such a way by the power analytics module 240 in an embodiment may be communicated to the data collector 261.

The power analytics module in an embodiment may determine hardware configurations, settings, or policies at block 308. For example, the power analytics module 240 may access firmware for hardware components (e.g., 220, 242, 243, 244, 245, 246, 247, or 248) to determine policies or settings for those components at the time of power measurements made at block 306. More specifically, the power analytics module 240 in an embodiment may determine whether a network interface device 220 is transceiving according to WLAN, WWAN, Bluetooth®, Remote Desktop Protocol (RDP), or Near Field Communication (NFC) standards, as well as policies setting a preference for one type of standard over another, or restrictions on operation of the first client information handling system 250 as a mirror server, on allowing remote users to make calls to the hardware processor 242, or on power consumption, data rate, or frequencies used by the network interface device 220. In another example, the power analytics module 240 in an embodiment may determine current usage of hardware processing resources by software applications as a percentage of total capacity for the hardware processor 242 (e.g., central processing unit (CPU), graphics processing unit (GPU), or visual processing unit (VPU)). In yet another example, the power analytics module 240 in an embodiment may determine a current usage mode for the display 245, such as day mode, night mode, power reserve mode, or gaming mode (e.g., high-resolution). In still another example embodiment, the power analytics module 240 may determine policies controlling the periods in which sensing hardware may be operational. More specifically, the power analytics module 240 in an embodiment may determine whether the peripheral device 249, location sensing device (e.g., GPS unit) 248, or camera 247 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 247, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

At block 310, a hardware processor executing the application analytics module may track software or firmware updates in an embodiment. For example, in an embodiment, the application analytics module 230 may monitor execution of software applications within the operating system (OS) for the first client information handling system 200. The application analytics module 230 in an embodiment may further track which software applications are running or idle (e.g., executing in the background) at various times, track CPU utilization, and track current versions of software applications and times at which updates to such software applications are performed. All information accessed in such a way by the application analytics module 230 in an embodiment may be communicated to the data collector 261.

The event viewer may track failed attempts at firmware or software updates in an embodiment at block 312. For example, the data collector 261 may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error, a failed attempt at firmware or software updating, or an unusually high consumption of power by hardware components, or identifying the driver or software application associated with a failed update. Such WHEA events may be associated with data packets that specifically identify the hardware component (e.g., 220, 242, 243, 244, 245, 246, 247, or 248) producing the error or consuming the unusually high power levels.

At block 314, a data collector of a client information handling system in an embodiment may gather event log data, or reports from analytics engines such as hardware analytics applications or software analytics applications, and translate these logs or reports into a predetermined data interchange format such as JavaScript Object Notation (JSON), Extensive Markup Language (XML), or Yet Another Markup Language (YAML). Any format may be used, but JSON is discussed herein by way of an example embodiment. For example, in an embodiment described with reference to FIG. 2, above, the hardware processor executing code instructions of the data collector 261 may gather reports from the power analytics module 240 and the application analytics module 230 and event logs from the event viewer 265. The data collector 261 in such an embodiment may further translate these reports and logs into JSON incidents for later parsing, searching, and editing by various components of the first client information handling system 250 and the CO2 emissions state remediation system 280. For example, the data collector 261 may generate the following JSON incident based on the information gathered and stored in Table 1, above:

```
{
  "data" :
  {
    "event_id" : 123460,
    "source_ID" : power_analytics_module,
    "timestamp_unixtime_ms" : 1544145450,
    "client_device_ID" : 456789,
    "client_device_model" : Laptop_7400,
    "location" : Paris_France,
    "custom_flags" :
      {
        "WHEA_error" : fan,
        "fan_workload" : 0.90,
        "Unsuccessful_initialization_attempt" : gaming_app,
        "gaming_application_GPU_usage" : 0.9,
        "background_application_memory_usage" : 0.9,
        "browsing_application_NID_usage" : 0.9,
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "fan_driver_version" : 14.2,
        "Display_mode" : high_definition,
```

-continued

"Camera_type" : webcam,
"Camera_detection_mode" : continuous_monitor,
"Camera_capture_mode" : high_resolution,
"OS_Version" : 10.2,
"efficiency_battery" : 0.59,
"usage_time_hours_perday" : 15,
"fan_power_consumption_watts" : 60,
"total_power_consumption_watts_perday" : 120,
"active_browsing_hours_perday" : 15;
}
}

The data classifier in an embodiment may classify objects within the gathered JSON event with preset incident types describing heat measurements, hardware component failures, or software application execution and usage for the client information handling system at the time of the event at block 316. For example, the data classifier 262 in an embodiment may edit the JSON incident created at block 314 by adding an incident classifier. More specifically, the data classifier 262 in an embodiment may analyze the JSON incident comprising operational telemetry measurements generated at block 314 to identify whether any of the JSON events and values associated with preset incident classifiers appear within the JSON incident.

For example, the hardware processor executing the data classifier 262 in an embodiment may determine the JSON incident comprising operational telemetry measurements described above includes the JSON event named "fan_workload," having a value of 0.90, or 90%, which is greater than the preset maximum fan workload of 85%. In other embodiments in which the data classifier 262 identifies a JSON event "fan_driver_install_time_mins" having a value greater than 60 minutes, or some other preset maximum installation time, or a JSON event "unsuccessful_driver_install_attempts," the data classifier 262 may determine these JSON events and values are associated with the preset incident classifier "driver_perf." In another aspect of such embodiments, the data classifier 262 may identify JSON events such as "active_browsing_hours_perday" having a value above 10, "server_mirroring" having a value "ON," "remote_desktop_protocol" having a value "ON," "remote_processor_calls" having a value "ALLOW." The data classifier 262 in such an embodiment may associate any of these JSON events and values with the classification "Config," and append these classifications to the JSON incident to generate a classified JSON incident comprising operational telemetry measurements such as:

}
"incident_class" : Workload,
"incident_class" : Driver_perf,
"incident_class" : Config,
}

The hardware processor may execute code instructions of the device index mapper in an embodiment to generate a classified and indexed JSON incident including one or more JSON events and classified incident types at block 318. For example, the device index mapper (DIM) 263 in an embodiment may associate the classified JSON incident comprising operational telemetry measurements with a device ID and device model for the first client information handling system 200. Such a device ID in an embodiment may be one of several device IDs for a plurality of information handling systems (e.g., including the first and second client information handling systems 250 and 270) stored at the CO2 emissions state remediation system 280. The device index mapper 263 in an embodiment may then edit the classified JSON incident comprising operational telemetry measurements to generate an indexed and classified JSON incident that includes this information:

{
"data" :
{
"event_id" : 123460,
"source_ID" : power_analytics_module,
"timestamp_unixtime_ms" : 1544145450,
"client_device_ID" : 456789,
"client_device_model" : Laptop_7400,
"location" : Paris_France,
"custom_flags" :
{
"WHEA_error" : fan,
"fan_workload" : 0.90,
"Unsuccessful_initialization_attempt" : gaming_app,
"gaming_application_GPU_usage" : 0.9,
"background_application_memory_usage" : 0.9,
"browsing_application_NID_usage" : 0.9,
}
"device_current_state :
{
"NID_1_type" : WLAN,
"NID_2_type" : WWAN,
"NID_2_data_transceived" : 100 GB,
"NID_3_type" : BT,
"memory_type" : 16_GB,
"CPU_type" : X_Series,
"GPU_type" : G_Series,
"SSD_type" : 256_GB,
"Display_type" : 15.6_HD_OLED,
"fan_driver_version" : 14.2,
"Display_mode" : high_definition,
"Camera_type" : webcam,
"Camera_detection_mode" : continuous_monitor,
"Camera_capture_mode" : high_resolution,
"OS_Version" : 10.2,
"efficiency_battery" : 0.59,
"usage_time_hours_perday" : 15,
"fan_power_consumption_watts" : 60,
"total_power_consumption_watts_perday" : 120,
"active_browsing_hours_perday" : 15;
}
}
"incident_class" : Workload,
}

At block 320, the device index mapper may transmit the JSON incident generated at block 318 to the recommendation agent of the client information handling system in an embodiment. As described herein, the recommendation agent 290 in an embodiment may determine an amount of CO2 emitted due to operation of the client information handling system 250 and define three CO2 emissions states in which the client information handling system 250 may operate during its life cycle. These states may include a first, optimal emissions state, a second monitoring period state, and a third, non-eco-friendly state.

The recommendation agent in an embodiment may edit the indexed and classified JSON incident to include a CO2 emissions value and CO2 emissions state for the client information handling system at block 322. The recommendation agent 290 in an embodiment may first determine a CO2 emissions value for the client information handling system 250 based on the classified and indexed JSON incident received from the device index mapper 263. This CO2 emissions value determination may be made based on the location of the device, the power consumed by each of the hardware components, the usage time for such power consumption, and the efficiency of the battery, as shown in the indexed and classified JSON incident.

The location of the client information handling system may define an estimated amount of $CO_2$ (in pounds per kWh) emitted during generation of the power consumed by the client information handling system. Carbon footprint for a client information handling system (e.g., 250 or 270) in an embodiment may be based on the measured power consumed by the client information handling system (e.g., 250 or 270), the duration of such consumption, and a location $CO_2$ emissions rate describing the amount of $CO_2$ or other GHGs emitted during generation of each Watt of power consumed by the client information handling system (e.g., 250 or 270). In embodiments, the recommendation agent 290 may communicate with the $CO_2$ optimization engine 285 or telemetry 282 to determine such a location $CO_2$ emissions rate for the client information handling systems 250 based on the location given within an indexed and classified JSON incident (e.g., as shown directly above) and stored in telemetry 282. For example, the recommendation agent 290 may communicate with the $CO_2$ optimization engine 285 or telemetry 282 to determine the location $CO_2$ emissions rate describing the amount of $CO_2$ of other GHGs emitted during generation of each Watt of power consumed by the client information handling system 250 in Paris, France (e.g., the location of the client information handling system 250 as shown in the indexed and classified JSON incident) to be 0.136 pounds $CO_2$ per kWh.

In an example embodiment, the $CO_2$ emissions value may be determined using the equation below to determine the $CO_2$ emissions value for the client information handling system 250 operating in Paris, France, where the location $CO_2$ emissions rate is 0.136 pounds $CO_2$ per kWh, the power consumed is 120 Watts over a usage time of 15 hours at a battery efficiency of 59% is equivalent to 0.415 pounds $CO_2$ per day:

$$\text{CO2 Emissions Value} = \frac{\text{location CO2 emissions rate} * \text{Power Consumed} * \text{Usage Time}}{\text{Battery Efficiency}}$$

The recommendation agent 290 in an embodiment may perform this determination of $CO_2$ emissions value for each indexed and classified JSON incident it receives from the device index mapper 263 over the $CO_2$ emissions state determination training period. Following such a determination, the recommendation agent 290 may append one or more JSON events indicating the $CO_2$ emissions value within the indexed and classified JSON incident most recently received from the device index mapper 263 and upon which such a determination was made.

The recommendation agent 290 may also define a $CO_2$ emissions state two threshold value, where $CO_2$ emissions values falling below this $CO_2$ emissions state two threshold value fall within an optimal $CO_2$ emissions state one. The hardware processor may execute code instructions of a recommendation agent to routinely gather indexed and classified JSON incidents from the device index mapper 263 during a training period occurring upon initial purchase of the client information handling system 250 or initial usage, in which the client information handling system 250 is assumed to be operating at optimal efficiency with respect to $CO_2$ emissions. Following this training period, which may have a duration set by the manufacturer or IT manager of the enterprise management system 230, the recommendation agent 290 may determine, for each indexed and classified JSON incident, an amount of $CO_2$ emitted due to power consumed by the client information handling system 250.

The maximum determined $CO_2$ emissions value across all JSON incidents during the training period may form the basis for the $CO_2$ emissions state two transition threshold value. For example, the recommendation agent 290 in an embodiment may determine the $CO_2$ emissions value using the equation above and an indexed and classified JSON incident identifying a total amount of power consumed by all hardware components of the client information handling system 250 to be 0.091 pounds $CO_2$ per day, as described in greater detail above with respect to FIG. 2. As also described in greater detail above with respect to FIG. 2, the recommendation agent 290 in an embodiment may also determine the three $CO_2$ emissions states in which the client information handling system 250 may operate during its life cycle based on the indexed and classified JSON incident received from device index manager 263. For example, the recommendation agent 290 in an embodiment may determine a second $CO_2$ emissions state between 0.091 and 0.364 pounds $CO_2$ per day and a third non-eco-friendly $CO_2$ emissions state above 0.364 pounds $CO_2$ per day.

The recommendation agent 290 in an embodiment may edit the indexed and classified JSON incident described above with respect to block 318 to include a $CO_2$ emissions value and $CO_2$ emissions state for the client information handling system. For example, the recommendation agent 290 may edit the classified and indexed JSON incident described above with respect to blocks 318 and 320 to generate the below $CO_2$ determined JSON incident:

```
{
 "data" :
 {
   "event_id" : 123461,
   "source_ID" : CO2_emissions_state_prediction_system,
   "timestamp_unixtime_ms" : 1544145450,
   "client_device_ID" : 456789,
   "client_device_model" : Laptop_7400,
   "location" : Paris_France,
   "custom_flags" :
     {
       "WHEA_error" : fan,
       "fan_workload" : 0.90,
       "Unsuccessful_initialization_attempt" : gaming_app,
       "gaming_application_GPU_usage" : 0.9,
       "background_application_memory_usage" : 0.9,
       "browsing_application_NID_usage" : 0.9,
       "CO2_emissions_value_lbsCO2_perday" : 0.415,
       "CO2_emissions_state" : 3,
     }
   "device_current_state :
     {
       "NID_1_type" : WLAN,
       "NID_2_type" : WWAN,
       "NID_2_data_transceived" : 100 GB,
       "NID_3_type" : BT,
       "memory_type" : 16_GB,
       "CPU_type" : X_Series,
       "GPU_type" : G_Series,
       "SSD_type" : 256_GB,
       "Display_type" : 15.6_HD_OLED,
       "fan_driver_version" : 14.2,
       "Display_mode" : high_definition,
       "Camera_type" : webcam,
       "Camera_detection_mode" : continuous_monitor,
       "Camera_capture_mode" : high_resolution,
       "OS_Version" : 10.2,
       "efficiency_battery" : 0.59,
       "usage_time_hours_perday" : 15,
       "fan_power_consumption_watts" : 60,
       "total_power_consumption_watts_perday" : 120,
```

-continued

```
        "active_browsing_hours_perday" : 15,
      }
  }
  "incident_class" : Workload,
}
```

At block 324 in an embodiment, the data segregator may determine whether the CO2 determined JSON incident indicates that the client information handling system is operating in state three. Following definition of the CO2 emissions states, as described directly above, a CO2 emissions monitoring period may begin, in which the recommendation agent 290 routinely receives indexed and classified JSON incidents (e.g., as described at block 320), and for each JSON incident received, determines the CO2 emissions value (e.g., as described directly above) and the CO2 emissions state indicated by the indexed and classified JSON incident. In an embodiment, the data segregator 266 may determine the CO2 emissions state of the client information handling system 250, based on the determined CO2 emissions value and the defining CO2 emissions state threshold values. For example, the data segregator 266 may determine that the client information handling system 250 that emitted 0.415 pounds CO2 per day, as indicated by a recently received indexed and classified JSON incident described directly above, is operating in the third state, because it is above the CO2 emissions state three threshold value of 0.364 pounds CO2 per day.

If the information handling system is operating within CO2 emissions state three, the CO2 emissions state remediation system at the UEM platform may monitor operational telemetry measurements for the client information handling system to identify one or more replacement user instructions for replacement of failed hardware components or remediating user instructions capable of returning the client information handling system to the eco-friendly CO2 emissions state one or two. The method may then proceed to block 326 for creation of a CO2 state monitoring period JSON incident including such operational telemetry measurements and transmission of that telemetry to the CO2 emissions state remediation system. If the information handling system is not operating within CO2 emissions state three (e.g., within either state one, or state two) while the CO2 emissions state remediation system at the UEM platform may monitor operational telemetry measurements for the client information handling system, remediation may not be necessary yet. In such a case, the data segregator may avoid regular transmission of the operational telemetry measurements for the client information handling system to the CO2 emissions state remediation system, since remediation may not be needed. The method may then end. In such a way, the data segregator may segregate operational telemetry measurements that are useful for predictions made by the CO2 emissions state remediation system from those that are not, and may avoid unnecessary power consumption and transmissions to the UEM platform.

The recommendation agent in an embodiment in which the data segregator determines the client information handling system is operating in CO2 emissions state three may edit the CO2 determined monitoring period JSON incident to include the CO2 emissions state two transition threshold value, CO2 emissions state three transition threshold value, and usage profiles to create a CO2 state monitoring period JSON incident at block 326. For example, the recommendation agent 290 in an embodiment may edit the CO2 determined monitoring period JSON incident generated at block 322 to include the CO2 emissions state two transition threshold value and CO2 emissions state three transition threshold value determined by the recommendation agent, as described above at block 322 to provide the following CO2 state monitoring period JSON incident:

```
{
  "data" :
  {
    "event_id" : 123462,
    "source_ID" : CO2_emissions_state_prediction_system,
    "timestamp_unixtime_ms" : 1544145450,
    "client_device_ID" : 456789,
    "client_device_model" : Laptop_7400,
    "location" : Paris_France,
    "custom_flags" :
      {
        "WHEA_error" : fan,
        "fan_workload" : 0.90,
        "Unsuccessful_initialization_attempt" : gaming_app,
        "gaming_application_GPU_usage" : 0.9,
        "background_application_memory_usage" : 0.9,
        "browsing_application_NID_usage" : 0.9,
        "CO2_emissions_value_lbsCO2_perday" : 0.415,
        "CO2_emissions_state" : 3,
        "CO2emissions_statetwo_threshold" : 0.091,
        "CO2emissions_statethree_threshold" : 0.364,
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "fan_driver_version" : 14.2,
        "Display_mode" : high_definition,
        "Camera_type" : webcam,
        "Camera_detection_mode" : continuous_monitor,
        "Camera_capture_mode" : high_resolution,
        "OS_Version" : 10.2,
        "efficiency_battery" : 0.59,
        "usage_time_hours_perday" : 15,
        "fan_power_consumption_watts" : 60,
        "total_power_consumption_watts_perday" : 120,
        "active_browsing_hours_perday" : 15,
      }
  }
  "incident_class" : Workload,
}
```

The process of blocks 302-326 in various embodiments described herein may be repeated at the end of each monitoring period, thus resulting in the client information handling system 250 transmitting a plurality of CO2 state monitoring period JSON incidents to the CO2 emissions state remediation system 280 over time. Such a process may also be repeated for a plurality of other client information handling systems (e.g., 270) within an enterprise network in an embodiment. These monitoring periods may occur repeatedly throughout the lifecycle of the client information handling system in order to predict, based on gathered CO2 determined JSON incidents, when remediation user instructions or replacement user instructions are needed to return the client information handling system to the eco-friendly CO2 emissions state one or two. The method may then end.

FIG. 4 is a flow diagram illustrating a method of transmitting a replacement user instruction or a remediation user instruction to a client information handling system to return the client information handling system to the eco-friendly CO2 emissions state one or two according to an embodiment of the present disclosure. As described herein, the CO2 emissions state remediation system in an embodiment may identify a failed hardware component in need of replacement that has caused the client information handling system to transition to the non-eco-friendly third CO2 emission state, and may optionally provide remediation user instructions for remediating or returning a client information handling system back to the first or second CO2 emissions state upon installation of that replacement part.

At block 402, the communication agent operating at the UEM platform in an embodiment may receive, and store in telemetry, CO2 state monitoring period JSON incidents from a plurality of client information handling systems over a plurality of monitoring periods. These CO2 state monitoring period JSON incidents may include operational telemetry measurements including user-adjustable operational telemetry measurements, such as power analytics, software application analytics, and event viewer error logs, as well as determined CO2 emissions values and state transition threshold values unique to each client information handling system. These CO2 state monitoring period JSON incidents may be gathered (e.g., as described above with respect to block 326 of FIG. 3) during routine monitoring periods from a plurality of client information handling systems at the cloud-based CO2 emissions state remediation system. For example, the communication agent 281 in an embodiment described above with respect to FIG. 2 may receive a plurality of CO2 state monitoring period JSON incidents from the first client information handling system 250 and the second client information handling system 270 over a plurality of monitoring periods. More specifically, the communication agent 281 in an embodiment may receive the CO2 state monitoring period JSON incident described above at block 326 of FIG. 3, in an example embodiment.

A systems internal health assessor operating at the UEM platform in an embodiment at block 404 may determine whether a hardware component failure is indicated within the most recently received CO2 state monitoring period JSON incident. In an embodiment, code instructions of a systems internal health assessor (SIHA) executing on processing resources at the Unified Endpoint Management (UEM) platform may identify one or more CO2 state monitoring period JSON incidents indicating hardware failure. For example, the SIHA 283 operating at the UEM platform 200 in an embodiment may identify one or more CO2 state monitoring period JSON incidents received from the client information handling system (e.g., 250 or 270) indicating hardware failure at those devices, as described in greater detail above with respect to FIG. 2.

A systems internal health assessor (SIHA) of the UEM platform 200 in an embodiment may identify the CO2 state monitoring period JSON incident received at block 402 as indicating failure of a hardware component of a given hardware type, or substantial functional inefficiency. For example, the SIHA 283 in an embodiment may search the CO2 state monitoring period JSON incident described above with respect to block 326, which has been transmitted to the communication agent 281 and stored in telemetry 282 for JSON events named "WHEA Error," having a value of "fan," indicating an error, such as a substantial inefficiency in the function the fan 243. Upon identification of such an error, alone or as part of a sequence of errors, associated with an identified hardware component, the SIHA 283 may transmit a notification to the communication agent 281 that the CO2 state monitoring period JSON incident (e.g., identified by event id given within the CO2 state monitoring period JSON incident), or sequence of JSON incidents indicates poor health of a hardware component.

At block 406, the CO2 emissions state remediation system in an embodiment may determine an optimal power consumption efficiency of a replacement part for the hardware component identified as failing at block 404. As described in greater detail below with respect to block 408, the CO2 emissions state remediation system 280 in an embodiment may use a neural network 286 to determine whether replacement of a failing hardware component (e.g., fan 283) alone will return the client information handling system 250 to the eco-friendly CO2 emissions state one or two. In order to do so, the CO2 emissions state remediation system may first need to approximate operational telemetry measurements that would be expected following the replacement of the failing component (e.g., fan 243) with the new component. One of these operational telemetry measurements that would change markedly following installation of a new component is the power efficiency for that component since efficiency of power consumption for hardware components decreases as the part ages.

The SIHA 283 in an embodiment operating at the UEM platform 200 may be in communication with an enterprise management system 230 which may include a component hub 231. In an embodiment, the component hub 231 may track all replacement hardware components that may be installed at any client information handling system (e.g., 250 or 270) within the enterprise system. Such a hub may also maintain specifications on each of the available replacement parts, including compatibility with certain client information handling systems (e.g., 250 or 270), status as new or refurbished, and various operational parameters, including optimal power consumption estimations. For example, such a hub may track the location of a new fan or a refurbished fan that is available for replacing the fan 243, having an optimal power consumption of 20 Watts and is compatible with the client information handling system 250. This optimal value of 20 Watts for fan power consumption may differ markedly from the power consumption of 60 Watts by the fan 243 as reflected in the most recently received CO2 state monitoring period JSON incident (e.g., shown at block 326 of FIG. 3).

The CO2 emissions state remediation system in an embodiment at block 408 may input the optimal power consumption efficiency of the replacement part determined at block 406 and the CO2 state monitoring period JSON incident received at block 402 into a crowd-source trained neural network to predict the CO2 emissions state that would result from replacing the hardware component identified as failing at block 404. This may begin with the CO2 emissions state remediation system 280 retrieving the CO2 state monitoring period JSON incident described above at block 326 of FIG. 3 for the client information handling system 250, and editing it to reflect replacement of the failing hardware component with the new hardware component. For example, the CO2 emissions state remediation system 280 may remove any JSON events relied upon by the SIHA 283 at block 404 of FIG. 4 as indicating failure of the hardware component to be replaced. This may reflect the assumption that a new replacement component will initially operate at peak health and will not immediately indicate signs of failure. As another example, the CO2 emissions state remediation system 280 may edit the CO2 state monitoring period JSON event to reflect optimal power consumption efficiency for the failed hardware component, as described in greater detail above with respect to blocks 406 and 408 of FIG. 4. This may reflect the assumption that the new replacement component will initially operate at peak health and will not immediately indicate signs of failure or an edit the CO2 state monitoring period JSON event to reflect optimal power consumption efficiency to indicate if any signs of failure exist for a refurbished replacement part that may have its life extended as a replacement part.

As described in greater detail above with respect to FIG. 2, a neural network 286 operating at the UEM platform 200 may model a relationship between each of a plurality of user-adjustable operational telemetry measurement values indicated within a first-recorded CO2 state monitoring period JSON incident and the CO2 emissions state indicated within a second, later-recorded CO2 state monitoring period JSON incident. The CO2 emissions state remediation system 280 in an embodiment may receive and input into such a trained neural network 286 the edited CO2 state monitoring period JSON incident (e.g., edited as described directly above) received from a first client information handling system (e.g., 250) to predict whether replacement of the hardware component identified at block 404 as failing may return the client information handling system (e.g., 250) to the eco-friendly state one or two.

The neural network 286 in an embodiment may be crowd-source trained on other sets of received CO2 state monitoring period JSON incidents from a plurality of client information handling systems (e.g., 250 and 270) using the same frequency of monitoring periods as that used by the information handling system 250. Further, in some embodiments, a separate neural network (e.g., 286) may be trained for each of a plurality of usage profiles for the plurality of client information handling systems, as described in greater detail above with respect to FIG. 2. The output of the neural network 286 in an embodiment may include a predicted CO2 emissions value or a predicted CO2 emissions state for the client information handling system (e.g., 250) if the replacement part (e.g., fan), such as a refurbished part, were installed from another client information handling system at the client information handling system.

At block 410, the CO2 emissions state remediation system in an embodiment may determine whether the neural network predicts replacement of the hardware component identified as failing will return the client information handling system to CO2 emissions state two or below. In some cases, replacement of a failed hardware component alone may not be sufficient to return a client information handling system to the eco-friendly first or second CO2 emissions states, and further remediation user instructions may be needed, as described in greater detail with respect to FIG. 5, below. The CO2 emissions state remediation system 280 in an embodiment may determine at block 410 whether such a remediation user instruction may be needed, in addition to replacement of the failed hardware component. If the neural network predicts replacement of the hardware component identified as failing will return the client information handling system to the CO2 emissions state two or below at block 410, this may indicate no need for actions other than replacement of the failing hardware component. The method may then proceed to block 416 for transmission of instructions for replacement of the failed hardware component with a new or refurbished replacement component. If the neural network predicts replacement of the hardware component identified as failing will not return the client information handling system to the CO2 emissions state two or below at block 410, this may indicate a need for actions other than replacement of the failing hardware component in order to remediate the CO2 emissions state of the client information handling system. The method may then proceed to block 412 for identification of other remediation user instructions that when executed by the user of the client information handling system in combination with replacement of the failed hardware component may return the client information handling system to the CO2 emissions state two or below.

The CO2 emissions state remediation system in an embodiment at block 412 in which replacement of the failed hardware component alone is not predicted to remediate the CO2 emissions state of the client information handling system may determine whether additionally implementing a remediation user instruction at the client information handling system is predicted to move the client information handling system to state two or below. Such a process for identifying such a remediation user instruction and generating a recommendation JSON incident including such a remediation user instruction is described in greater detail below with respect to FIG. 5. If a remediation user instruction is predicted to move the client information handling system to state two or below, when implemented in combination with replacement of the failed hardware component, the method may proceed to block 414 for transmission of such an identified remediation user instruction to the client information handling system. If no remediation user instruction is predicted to move the client information handling system to state two or below, even when implemented in combination with replacement of the failed hardware component, the method may proceed to block 416 for transmission of instructions for replacement of the failed hardware component.

At block 414, the CO2 emissions state remediation system in an embodiment in which a remediation user instruction is predicted to move the client information handling system to state two or below, when implemented in combination with replacement of the failed hardware component may transmit such an identified remediation user instruction to the client information handling system for display via a graphical user interface (GUI). For example, as described below with respect to FIG. 5, the CO2 emissions state remediation system 280 may generate a recommendation JSON incident including a remediation user instruction to cap the GPU resources made available to the gaming application at 85%. Such a recommendation JSON incident may be transmitted from the recommendation agent 290 to the CO2 emissions state remediation system 280 via the communication agent 281 in an embodiment. The recommended remediation user instructions within the recommendation JSON incidents may be displayed for selection by a user via a graphical user interface (GUI) 291. The user may then choose whether to implement one or more of the recommended remediation user instructions.

Upon selection by the user of the remediation user instruction for implementation at the client information handling system 250, the recommendation agent 291 may coordinate with the power analytics module 240 and software application analytics module 230 to execute the remediation user instruction identified within the recommendation JSON incident associated with the user accepted recommendation. For example, the user in an embodiment may have accepted a recommendation which provides a remediation user instruction to cap GPU resources made available to the gaming application at 85%. In such an embodiment, the software application analytics module 230 may execute such an instruction to cap the GPU 242 resources made available to the gaming application at 85%. By decreasing the amount of GPU 242 resources made available to the gaming application in such a way, the user of the client information handling system 250 may effectively avoid increased wear and tear on the new replacement part for the failed fan 283, ensuring a return of the client information handling system 250 to the eco-friendly CO2 emissions state one or two.

The CO2 emissions state remediation system in an embodiment at block 416 may transmit an instruction to the enterprise management system to ship a new replacement part to the information handling system. In an embodiment in which the CO2 emissions state remediation system predicts replacement of the failing hardware component, alone or in combination with a remediation user instruction may return the client information handling system 250 to the eco-friendly CO2 emissions state one or two, the CO2 emissions state remediation system 280 may communication with the component hub 231 to order the new replacement part. For example, the CO2 emissions state remediation system 280 may identify a plurality of replacement parts that are compatible with the client information handling system 250 and check the hub 231 to identify one of the plurality of replacement parts that is located closest to the client information handling system 250. In an embodiment, the CO2 emissions state remediation system 280 may then instruct the component hub 231 to prepare that component replacement part for shipping to the known location of the client information handling system 250 (e.g., Paris, France), which may be identified within the most recently received JSON state monitoring period incident (e.g., as shown at block 326 of FIG. 3). In such a way, the CO2 emissions state remediation system 280 may automate shipment of the nearest compatible replacement part while minimizing the carbon footprint of such transportation.

At block 418, the CO2 emissions state remediation system in an embodiment may transmit an instruction to the client information handling system user to install the new replacement part received from the enterprise management system. During communication with the component hub 231, as described directly above, the CO2 emissions state remediation system 280 in an embodiment may receive identification of the replacement part (e.g., new fan) that will be shipped to the client information handling system 250. More specifically, the CO2 emissions state remediation system 280 may receive a bar code, stock keeping unit (SKU) number, other type of serial number, or QR code capable of identifying the replacement part. The CO2 emissions state remediation system 280 in such an embodiment may then transmit an instruction to the client information handling system 250 to install the component device that matches one or more of those identifiers upon receipt of the part at the location of the client information handling system 250. Such instructions may be transmitted to the client information handling system 250 for display via the GUI 291, or through various other mechanisms, including e-mail. These instructions may also be included within the ordered shipment from the component hub 231 to the client information handling system 250, along with the replacement part. In such a way, the CO2 emissions state remediation system may orchestrate replacement of failed hardware components across an enterprise network and provide any additional remediation user instructions for adjustments to the operation of a client information handling system necessary to return the client information handling system to an eco-friendly CO2 emissions state one or two. The method for transmitting a replacement user instruction or a remediation user instruction to a client information handling system to return the client information handling system to the eco-friendly CO2 emissions state one or two may then end.

Returning to block 412, no user remediation instruction is predicted via the neural network output to move the client information handling system to state two or below, then the flow may proceed to block 420. When a component replacement with a new or refurbished component in addition execution of no user remediation instructions will not, as predicted by the trained neural network for the CO2 emissions state remediation system, move the client information handling system to state two or below, then the CO2 emissions state remediation system may recommend replacement of the client information handling system in an embodiment at block 420. The cloud-based CO2 emissions state remediation system may transmit to an IT manager or to a user via the client information handling system of the state three status of the client information handling system and that no replacement component or user remediation instruction will improve the greenhouse gas emissions state or the operation of the client information handling system. Then the method for transmitting a replacement user instruction or a remediation user instruction to a client information handling system to return the client information handling system to the eco-friendly CO2 emissions state one or two or to replace the client information handling system may then end.

FIG. 5 is a flow diagram illustrating a method of identifying a remediation user instruction that, in combination with replacement of a failed hardware component, is predicted to return the client information handling system to the eco-friendly CO2 emissions state one or two according to an embodiment of the present disclosure. As described herein, execution of code instructions for a cloud-based CO2 emissions state remediation system may predict, via hardware processing resources at a UEM platform, when replacement of a failed hardware component alone may fail to move the client information handling system from the non-eco-friendly current third state to the eco-friendly first or second state. In some cases, replacement of a failed hardware component alone may not be sufficient to return a client information handling system to the eco-friendly first or second CO2 emissions states. For example, in some cases, inefficient usage of hardware components or software applications at a client information handling system may cause the hardware failure and consequently, the transition to the non-eco-friendly CO2 emissions state three. In such a scenario, replacement of the failed hardware component may fail to remedy the inefficient usage of hardware components or software applications, and may result in another failure of the replacement part in the near future. This may inhibit or limit the duration of any remediation of the client information handling system back to the eco-friendly first or second CO2 emissions states. The CO2 emissions state remediation system in embodiments of the present disclosure address this issue by identifying remediation user instructions that will accomplish this goal, when implemented at the client information handling system in addition to replacement of the failed component.

At block 502, the CO2 emissions state remediation system in an embodiment may identify the operational telemetry measurement types associated with the failed hardware component identified at block 404 of FIG. 4 and adjustable by the user as candidate remediable telemetry measurements. In order to determine remediation user instructions, the CO2 emissions state remediation system 280 may first identify one or more user-adjustable operational telemetry measurements included within the most recently received CO2 state monitoring period JSON incident that could have caused recent hardware failure and transition at the client information handling system 250 to the non-eco-friendly CO2 emissions state three. Because the goal is generation of a remediation user instruction to adjust user-adjustable operational telemetry levels to change the operational telemetries measured within CO2 state monitoring period JSON incidents and remedy such a transition, the CO2 emissions state remediation system 280 may determine those operational telemetries that are adjustable by the user via such remediation user instructions. In such a way, the CO2 emissions state remediation system 280 may narrow the field of remediation user instructions for reversing hardware component failure analyzed by the neural network to determine if such remediation user instructions may effectively remedy such a transition when performed in combination with replacing the failed hardware component, as described in greater detail below.

For example, in an embodiment in which the SIHA 283 has identified failure of the fan at block 404 of FIG. 4, the CO2 emissions state remediation system 280 may identify each JSON event having a name that includes the word "fan" within the most recently received CO2 state monitoring period JSON incident. More specifically, the protective CO2 emissions minimization system 280 may identify the JSON event "fan_driver_version" to determine whether this JSON event is associated with a known remediation user instruction for adjusting the value associated with the JSON event "fan_driver_version" to remedy the recent transition to the non-eco-friendly CO2 emissions state three. This may be repeated for each hardware component (e.g., 222, 242, 243, 244, 245, 246, 247, or 248) that the SIHA 283 may have identified as failing at block 404 of FIG. 4.

In another example, associations between various hardware components and routinely recorded operational telemetry measurements may be stored in telemetry 282. For example, failure of a fan 243 in an embodiment may be caused by any increase in temperature caused by a high workload on any of several other hardware components (e.g., memory 246, processor 242, network interface device 220). In such an example embodiment, the telemetry 282 may store an association between any user-adjustable operational telemetry measurements indicating high workload at any of these hardware components (e.g., 220, 242, 246) and failure of the fan. In still another example, telemetry 282 may store an association between a user-adjustable operational telemetry measurement indicating a high workload at any hardware component, and failure of that hardware component. More specifically, failure of the GPU 242 may be associated with a high workload placed on the GPU 242 by a gaming software application. In another example, failure of the memory 246 or a portion thereof may be associated with a high workload placed on the memory by background software applications. In still another example, failure of the network interface device 220 may be associated with a high workload placed on the network interface device 220 by a browsing software application. In these example embodiments, the CO2 state monitoring period JSON incident reflecting failure of a hardware component may include the classification "workload," "app_usage," or "background_usage."

As yet another example, telemetry 282 may store an association between any user-adjustable operational telemetry measurements indicating hardware configurations or policies affecting usage of hardware components (e.g., 220, 242, 246) that may result in failure of those components. More specifically, failure of the network interface device 220 may be associated with configurations allowing for a high number of active browsing hours per day (e.g., total active browsing sessions across all windows exceeding a browsing application maximum threshold value of ten), of allowing the client information handling system 250 to operate as a mirror server, remote desktop, or remote processor for other devices. In another example, failure of the display 245 may be associated with a configuration allowing the display 245 to consistently operate in full power mode or high definition mode. In still another example, failure of the camera 247 or processor 242 (e.g., GPU) may be associated with a configuration placing the camera in active sensing mode or high definition mode. In these example embodiments, the CO2 state monitoring period JSON incident reflecting failure of a hardware component may include the classification "config."

In still another example, telemetry 282 may store an association between any user-adjustable operational telemetry measurements indicating under-performing versions of firmware or software that may result in failure of various hardware components. More specifically, telemetry 282 may store an association between any hardware component (e.g., fan 243, battery 244, camera 247, display 245, GPS unit 248) and its currently installed driver. As another example, telemetry 282 may store an association between any software version executing within the operating system or any version of the operating system itself with failure of the memory 246, fan 243 (e.g., due to high temperatures generated at the processor 242), or network interface device 220 (e.g., due to repeated transmissions or dropped packets from failed calls to other applications or devices). In these example embodiments, the CO2 state monitoring period JSON incident reflecting failure of a hardware component may include the classification "driver_perf."

The CO2 emissions state remediation system in an embodiment at block 504 may identify the first candidate remediable telemetry measurement as the measurement of interest (e.g., the first candidate user-adjustable operational telemetry measurement). As described herein, the CO2 emissions state remediation system may identify one or more remediation user instructions that the neural network predicts will return the client information handling system to the eco-friendly CO2 emissions state one or two, when implemented at the client information handling system in addition to replacement of the failed component. In order to do this, the CO2 emissions state remediation system 280 in an embodiment may test whether remediation user instructions known to be associated with the above-identified candidate user-adjustable operational telemetry measurements. Such an analysis may be performed for each of the candidate user-adjustable operational telemetry measurements identified above at block 502. For an example, the CO2 emissions state remediation system 280 in an embodiment may identify the candidate user-adjustable operational telemetry measurement indicated by the JSON event named "gaming_application_GPU_usage," which may indicate a high workload on the GPU leading to failure of the GPU or the fan as the user-adjustable operational telemetry measurement of interest.

At block 506, the CO2 emissions state remediation system in an embodiment may identify an available remediation user instruction associated with the measurement of interest. For example, as described in an embodiment with reference to FIG. 2, the CO2 emissions state remediation system 280 may determine one or more remediation user instructions that the user of the client information handling system 250 may execute in order to return the client information handling system 250 to the eco-friendly CO2 emissions state one or two. As described herein, the CO2 emissions state remediation system 280 may ultimately recommend a specific remediation user instruction that may be implemented by the user of the client information handling system 250 to return the client information handling system to the eco-friendly CO2 emission state one or state two. Because the goal is generation of a remediation user instruction to adjust the operation of the replacement hardware component to decrease CO2 emissions, the CO2 emissions state remediation system 280 may focus on operational telemetries that are adjustable by the user via such remediation user instructions. In such a way, the protective CO2 emissions minimization system 280 may narrow the field of remediation user instructions analyzed by the neural network for determination as to whether such remediation user instructions may effectively return the client information handling system to the eco-friendly CO2 emissions state one or two, as described in greater detail below.

Such remediation user instructions and their associations with various user-adjustable operational telemetry measurements in an embodiment may be stored in telemetry 282, for example. Telemetry 282 in an embodiment may store a list of identified JSON event names found within a plurality of CO2 state monitoring period JSON incidents whose values may be adjusted through a specific remediation user instruction to return the client information handling system to the eco-friendly CO2 emissions state one or two. For example, the CO2 emissions state remediation system 280 in an embodiment in which the SIHA 283 has identified failure of the fan may search telemetry 282 to determine that the JSON event name "fan_driver_version" is user adjustable through a remediation user instruction to update the version of the driver for the fan 243 installed at the client information handling system 250. More specifically, the identified failure of the fan 243 may be associated with a remediation user instruction to update the fan driver from version 14.2 to version 16.1.

In another example embodiment in which the measurement of interest includes a JSON event indicating a high workload on a hardware component, telemetry 282 may have a stored association between that high workload indication and a remediation user instruction to lower that workload. More specifically, the SIHA 283 in an embodiment may identify failure of the GPU 242, or the fan 243, and the measurement of interest may include the high GPU 242 workload JSON event named "gaming_application_GPU_usage" shown in the CO2 state monitoring period JSON incident (e.g., as described with reference to FIG. 3 at block 326), having a value above a maximum threshold of 85% in one example. In such an example embodiment, the CO2 emissions state remediation system 280 may search telemetry 282 to identify an association between the measurement of interest (e.g., JSON event named "gaming_application_GPU_usage") and a remediation user instruction to cap the GPU 242 resources made available to the gaming application. More specifically, the measurement of interest in such an embodiment may be associated in telemetry 282 with a remediation user instruction to cap the GPU 242 resources made available to the gaming application at 85% of total available resources.

In another example embodiment, the SIHA 283 may identify failure of the fan 243 or the network interface device 220, and the measurement of interest may include a high network interface device 220 workload JSON event named "browsing_application_NID_usage" having a value above a maximum threshold of 80%. In such an example embodiment, the CO2 emissions state remediation system 280 may search telemetry 282 to identify an association between the measurement of interest (e.g., JSON event named "browsing_application_NID_usage") and a remediation user instruction to cap the network interface device 220 resources made available to the browsing application. More specifically, the measurement of interest in such an embodiment may be associated in telemetry 282 with a remediation user instruction to cap the network interface device resources made available to the browsing application at 80% of total available resources.

In still another example embodiment, the SIHA 283 may identify failure of the fan 243 or the memory 246, and the measurement of interest may include a high memory 246 workload JSON event named "background_application_memory_usage" having a value above a maximum threshold of 50% in one example. In such an example embodiment, the CO2 emissions state remediation system 280 may search telemetry 282 to identify an association between the measurement of interest (e.g., JSON event named "background_application_memory_usage") and a remediation user instruction to cap the memory 246 resources made available to the background applications. More specifically, the measurement of interest in such an embodiment may be associated in telemetry 282 with a remediation user instruction to cap the memory resources made available to the background application at 50% of total available resources.

As yet another example embodiment, the SIHA 283 may identify failure of the fan 243, memory 246, or network interface device 220, and the measurement of interest may include a JSON event named "OS_version," indicating an outdated version of the OS is currently executing at the client information handling system 250. In such an example embodiment, the CO2 emissions state remediation system 280 may search telemetry 282 to identify an association between the measurement of interest (e.g., JSON event named "OS_version") and a remediation user instruction to update the OS.

In still another example embodiment, the SIHA 283 may identify failure of the fan 243, or network interface device 220, and the measurement of interest may include a JSON event named "active_browsing_hours_perday," indicating a high number of total hours in which browsing application windows remain active. In such an example embodiment, the CO2 emissions state remediation system 280 may search telemetry 282 to identify an association between the measurement of interest (e.g., JSON event named "active_browsing_hours_perday") and a remediation user instruction to cap the number of hours in which active browsing sessions are executed at eight hours per day.

These associations between remediation user instructions and the measurement of interest may reflect crowd-sourced determinations that such remediation user instructions for adjusting operational parameters of various client information handling systems (e.g., 250 or 270) may extend the life of the identified failed hardware component type. For example, a remediation user instruction for updating the driver for a fan 283 may be known, through crowd-sourced operational telemetry measurements gathered across a plurality of client information handling systems (e.g., 250 and 270) to co-occur or result in extension of life of that fan 283. Such remediation user instructions and their associations with various hardware components (e.g., 220, 243, 248, 246, 247, or 248) may be stored in telemetry 282 in an embodiment.

These are only a few examples of remediation user instruction that may be associated with a failed hardware component. It is contemplated that remediation user instructions may include any instructed adjustment to policies or settings controllable by the power analytics module 240 or settings controllable by the application analytics module 230. For example, any remediation user instructions that may result in lower temperatures being generated within the chassis of the client information handling system 250 may be associated with the fan 243 in an embodiment. More specifically, such remediation user instructions may include capping resources of the network interface device 220, various hardware processors 242 (e.g., CPU, GPU, VPU, etc.), or memory 246 made available to various software applications executing at the client information handling system 250, for example. As another example, such remediation user instructions may include updating firmware versions for various hardware components (e.g., 220, 243, 244, 245, 247, or 248) via the power analytics module 240. In still another example, such remediation user instructions may include limiting execution time for various software applications (e.g., browsing applications) at the client information handling system 250. It is also contemplated that these example remediation user instructions may be associated with any number of components (e.g., 220, 244, 245, 247, or 248), not just the fan 243 in various embodiments.

The CO2 emissions state remediation system in an embodiment at block 508 may input the measurement of interest reflecting implementation of the available remediation user instruction and replacement of the failing hardware component, and other operational telemetry measurements from the most recently received CO2 state monitoring period JSON incident into the crowd-source trained neural network to predict CO2 emissions state for a client information handling system if the user executed the available remediation user instruction. This may begin with the CO2 emissions state remediation system 280 retrieving the CO2 state monitoring period JSON incident described above at block 326 of FIG. 3 for the client information handling system 250. For each example embodiment describing various available remediation user instructions, the CO2 state monitoring period JSON incident may be edited to reflect replacement of the failing hardware component with the new hardware component. For example, the CO2 emissions state remediation system 280 may remove any JSON events relied upon by the SIHA 283 at block 404 of FIG. 4 as indicating failure of the hardware component to be replaced. This may reflect the assumption that a new replacement component will initially operate at peak health and will not immediately indicate signs of failure. As another example, the CO2 emissions state remediation system 280 may edit the CO2 state monitoring period JSON event to reflect optimal power consumption efficiency for the failed hardware component, as described in greater detail above with respect to blocks 406 and 408 of FIG. 4. This may reflect the assumption that either a new replacement component will initially operate at peak health and will not immediately indicate signs of failure or the edit to the CO2 state monitoring period JSON event to reflect optimal power consumption efficiency may reflect the indications toward failure, if any, of a replacement with a refurbished component from other client information handlings systems managed by an enterprise in example embodiments.

The CO2 emissions state remediation system 280 may also edit the CO2 state monitoring period JSON incident to reflect implementation of one or more remediation user instructions associated with the measurement of interest in an embodiment. For example, in an embodiment in which the available remediation user instruction includes updating the firmware for the fan 243 from version 14.2 to 16.3, the CO2 emissions state remediation system 280 may edit the CO2 state monitoring period JSON incident described above with respect to block 326 of FIG. 3 by changing the value associated with the JSON event named "fan_driver_version" from 14.2 to 16.1. The CO2 emissions state remediation system 280 in an embodiment may then input this edited CO2 state monitoring period JSON incident into the neural network 286 modeling the relationship between operational telemetry measurements and CO2 emissions values. The output of the neural network 286 in an embodiment may represent a predicted CO2 emissions value for the client information handling system 250 if the user were to update the fan driver to version 16.1.

As another example, in an embodiment in which the JSON event named "gaming_application_GPU_usage," associated with a remediation user instruction to cap the GPU resources made available to the gaming application at 85% of total available resources is the measurement of interest, the CO2 emissions state remediation system 280 may edit the CO2 state monitoring period JSON incident by replacing the value of 0.9 for the JSON event named "gaming_application_GPU_usage" with the value of 0.85. In yet another example, in an embodiment in which the JSON event named "background_applications_memory_usage," associated with a remediation user instruction to cap the memory resources made available to the background applications at 50% of total available resources is the measurement of interest, the CO2 emissions state remediation system 280 may edit the CO2 state monitoring period JSON incident by replacing the value of 0.9 for the JSON event named "background_applications_memory_usage" with the value of 0.5. In still another example, in an embodiment in which the JSON event named "browsing_applications_NID_usage," associated with a remediation user instruction to cap the network interface device resources made available to the browsing application at 80% of total available resources is the measurement of interest, the CO2 emissions state remediation system 280 may edit the CO2 state monitoring period JSON incident by replacing the value of 0.9 for the JSON event named "browsing_applications_NID_usage" with the value of 0.8.

In yet another example, in an embodiment in which the JSON event named "OS_version," associated with a remediation user instruction to update the OS system to the latest available version (e.g., 13.1) is the measurement of interest, the CO2 emissions state remediation system 280 may edit the CO2 state monitoring period JSON incident by replacing the value of 10.2 for the JSON event named "OS_version" with the value of 13.1. As still another example, in an embodiment in which the JSON event named "active_browsing_hours_perday," associated with a remediation user instruction to decrease the number of hours in which browsing windows are allowed to remain active to eight hours total (across all active windows) is the measurement of interest, the CO2 emissions state remediation system 280 may edit the CO2 state monitoring period JSON incident by replacing the value of 10.2 for the JSON event named "active_browsing_hours_perday" with the value of 8.

In some embodiments, the CO2 emissions state remediation system may input edited CO2 state monitoring period JSON incidents reflecting more than one remediation user instruction into the neural network at one time. This may allow the CO2 emissions state remediation system to determine whether execution of any combination of the identified remediation user instructions may return the client information handling system 250 to the eco-friendly CO2 emissions state one or two. For example, the CO2 emissions state remediation system in an embodiment may test whether updating the OS version and capping the number of active browsing hours, in combination, may effectively return the client information handling system 250 to the eco-friendly CO2 emissions state one or two.

At block 510, the CO2 emissions state remediation system in an embodiment may determine whether the neural network predicts that implementation of the remediation user instruction associated with the measurement of interest for the user-adjustable operational telemetry measurement being assessed, in combination with replacement of the failing hardware component will place the client information handling system into CO2 emissions state one or two. In other words, the CO2 emissions state remediation system 280 in an embodiment may use the neural network 296 output to determine whether implementation of the remediation user instruction at the client information handling system 250, in combination with replacement of the failing hardware component will return the client information handling system 250 to the eco-friendly CO2 emissions state one or two by adjusting one or more user-adjustable operational telemetry levels. If the neural network predicts that implementation of the remediation user instruction associated with the measurement of interest at the client information handling system 250, in combination with replacement of the failing hardware component will not return the client information handling system 250 to the eco-friendly CO2 emissions state one or two, the CO2 emissions state remediation system 280 may not recommend such a remediation user instruction for implementation at the client information handling system 250. The method may then proceed to block 512 for analysis of the next candidate user-adjustable operational telemetry measurement. If the neural network predicts that implementation of the remediation user instruction associated with the measurement of interest at the client information handling system 250, in combination with replacement of the failing hardware component will return the client information handling system 250 to the eco-friendly CO2 emissions state one or two, the method may proceed to block 514 for the CO2 emissions state remediation system 280 to prepare a recommendation for implementing the available remediation user instruction, or combination of remediation user instructions associated with the measurement of interest to adjust that user-adjustable operational telemetry measurement.

In an embodiment in which the neural network predicts that implementation of the remediation user instruction associated with the measurement of interest at the client information handling system, in combination with replacement of the failing hardware component will not return the client information handling system 250 to the eco-friendly CO2 emissions state one or two, the CO2 emissions state remediation system at block 512 may identify the next candidate remediable telemetry measurement as the next measurement of interest. For example, the CO2 emissions state remediation system 280 in an embodiment may identify the JSON event named "gaming_application_GPU_usage," associated with a remediation user instruction to cap the GPU resources made available to the gaming application at 85% of total available resources, as the measurement of interest. The method may then proceed back to block 506 for identification of an associated remediation user instruction and determination as to whether implementation of such a remediation user instruction, in combination with replacement of the failed hardware component may return the client information handling system 250 in the eco-friendly CO2 emissions state one or two.

The CO2 emissions state remediation system 280 in an embodiment may also analyze whether any combination of the remediation user instructions associated with the candidate remediable telemetry measurement may effectively avoid such a transition. For example, after inputting the remediation user instructions associated with each candidate remediable telemetry measurement of interest into the neural network individually, the CO2 emissions state remediation system 280 may then input a plurality of remediation user instructions associated with every possible combination of the candidate remediable telemetry measurements in an embodiment. By repeating the loop between blocks 506 and 512 in an embodiment, the CO2 emissions state remediation system 280 may determine which of the remediation user instructions associated with the candidate remediable telemetry measurements identified at block 502, in combination with replacement of the failed hardware component may effectively return the client information handling system 250 to the eco-friendly CO2 emissions state one or two.

The CO2 emissions state remediation system in an embodiment in which the neural network predicts that implementation of the remediation user instruction associated with the measurement of interest, in combination with replacement of the failed hardware component at the client information handling system will return the client information handling system to the eco-friendly CO2 emissions state one or two may generate a recommendation JSON incident at block 514 for recommending implementation of the remediation user instruction at the client information handling system. The recommendation made to the user of the client information handling system 250 in an embodiment may include one or more of the remediation user instructions identified at block 510 as likely to return the client information handling system to the eco-friendly CO2 emissions state one or two. Such a recommendation in an embodiment may be given within a recommendation JSON incident and may also include identification of the candidate remediable telemetry measurements associated with those remediation user instructions (e.g., as an identified candidate client device operation cause of the predicted transition), as well as a predicted CO2 emissions state after the remediation user instruction has been implemented, in combination with replacement of the failed hardware component.

In an example embodiment, the CO2 emissions state remediation system 280 may generate the following recommendation JSON incident including a remediation user instruction to cap the GPU resources made available to the gaming application at 85%:

```
{
  "data" :
  {
    "event_id" : 987653,
    "source_ID" : protective_CO2_emissions_minimization_system,
    "timestamp_unixtime_ms" : 2984657051,
    "custom_flags" :
      {
        "reference_CO2_state_monitoring_period_incident_id" : 123462,
        "Gaming_application_GPU_usage" : 0.85,
      }
  }
}
```

As shown above, the recommendation JSON incident may reference the CO2 state monitoring period JSON incident used by the SIHA at block 404 of FIG. 4 to identify a failed hardware component, having an event ID of 123462.

The CO2 emissions state remediation system in an embodiment may determine at block 516 whether all of the candidate remediable telemetry measurements have been analyzed to determine whether their associated remediation user instructions, in combination with replacement of the failed hardware component may effectively return the client information handling system to the eco-friendly CO2 emissions state one or two. If each of the candidate remediable telemetry measurements have been so analyzed, the method may proceed with transmission of all recommendation JSON incidents generated through the loop between blocks 506 and 514, in which the neural network has predicted one or more remediation user instructions, in combination with replacement of the failed hardware component may effectively return the client information handling system to the eco-friendly state one or two. If each of the candidate remediable telemetry measurements have not been so analyzed, the method may proceed back to block 512 to identify the next candidate remediable telemetry measurement as the measurement of interest. By repeating the loop between blocks 506 and 516, the CO2 emissions state remediation system in an embodiment may generate a recommendation JSON incident for each remediation user instruction or combination of remediation user instructions predicted by the neural network to return the client information handling system to the eco-friendly CO2 emissions state one or two, in combination with replacement of the failed hardware component.

At block 516, upon all remediable telemetry measurements having been analyzed, the CO2 emissions state remediation system in an embodiment may transmit all recommendation JSON incidents to the client information handling system for display via a graphical user interface (GUI). For example, the CO2 emissions state remediation system 280 in an embodiment may transmit the recommendation JSON incident having the event ID 987653, as described above with respect to block 514 to the client information handling system 250 for display to the user via GUI 291. The method for identifying a remediation user instruction that, in combination with replacement of a failed hardware component, is predicted to return the client information handling system to the eco-friendly CO2 emissions state one or two may then end. In such a way, the CO2 emissions state remediation system may correct any inefficient usage of hardware components (e.g., including the replacement for the failed hardware component) that may cause a repeated failure of the newly installed component in the near future.

The blocks of the flow diagrams of FIGS. 3, 4, and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A unified endpoint management (UEM) platform information handling system executing machine readable code instructions of a carbon dioxide (CO2) emissions state remediation system comprising:

a network interface device to receive operational telemetry measurements for a client information handling system during routine monitoring intervals, including power consumption usage levels across each of a plurality of hardware components of the client information handling system, software application operational consumption of hardware component resources for execution, event viewer error logs, an overall determined CO2 emissions value exceeding a non-eco-friendly state transition threshold value determined for the client information handling system, and an indication of a failed hardware component;

a hardware processor executing computer readable code instructions of the CO2 emissions state remediation system to input received operational telemetry measurements for the client information handling system during a first routine monitoring interval and received operational telemetry measurements for the client information handling system during a second, prior routine monitoring interval into a trained neural network algorithm to output changes in CO2 emissions values over the first routine monitoring period that is a most recent monitoring interval relative to the operational telemetry measurements over the second, prior monitoring period immediately preceding the most recent, first monitoring routine interval to determine that replacement of the failed hardware component identified in the received operational telemetry measurements with a new replacement component having a known power efficiency value at the client information handling system will cause a future overall determined CO2 emissions value for the client information handling system to fall below the non-eco-friendly state transition threshold value as an output from the neural network algorithm, wherein the trained neural network algorithm is trained to model a relationship between changes in CO2 emissions values and changes in the operational telemetry measurements over the routine monitoring intervals;

the hardware processor executing computer readable code instructions of the carbon dioxide (CO2) emissions state remediation system to generate a replacement instruction to identify and replace the failed hardware component with the new replacement component; and the network interface device to transmit the replacement instruction for display to a user of the client information handling system via a graphical user interface (GUI) to replace the failed hardware component with the new replacement component.

2. The UEM platform information handling system of claim 1, wherein the determined CO2 emissions value is determined for each routine monitoring interval at the client information handling system based on power consumption and physical location of the client information handling system, indicating CO2 used in generating power for the client information handling system at the physical location.

3. The UEM platform information handling system of claim 1, wherein the failed hardware component is a fan.

4. The UEM platform information handling system of claim 1, wherein the failed hardware component is a memory.

5. The UEM platform information handling system of claim 1, wherein the failed hardware component is a network interface device.

6. The UEM platform information handling system of claim 1, wherein the failed hardware component is a location tracker.

7. The UEM platform information handling system of claim 1, wherein the failed hardware component is a display.

8. A method of remediating a carbon dioxide (CO2) emissions state for a client information handling system executing on a unified endpoint management (UEM) platform information handling system comprising:

receiving, via a network interface device, operational telemetry measurements, including user-adjustable operational telemetry measurements for a client information handling system during routine monitoring intervals, including power consumption usage levels across each of a plurality of hardware components of the client information handling system, software application operational consumption of hardware component resources for execution, and event viewer error logs;

receiving, via the network interface device, an overall determined CO2 emissions value exceeding a non-eco-friendly state transition threshold value determined for the client information handling system and an indication of a failed hardware component from among the plurality of hardware components of the client information handling system;

identifying, via a hardware processor executing machine readable code instructions, a remediation user instruction associated with the failed hardware component received from a user of the client information handling system;

executing, via the hardware processor, computer readable code instructions of a trained neural network algorithm to input the operational telemetry measurements received, the overall determined CO2 emissions value exceeding the non-eco-friendly state transition threshold value, the indication of the failed hardware component, and an identified power efficiency value for a new replacement component of a same hardware type as the failed hardware component into a neural network algorithm, wherein the trained neural network algorithm is trained to model a relationship between changes in CO2 emissions values and changes in the operational telemetry measurements over the routine monitoring intervals;

executing the computer readable code instructions of the trained neural network algorithm, via the hardware processor, to determine, as output, changes in CO2 emissions values over a most recent monitoring period and changes in operation of the client information handling system causing a change in the operational telemetry measurements received over the most recent monitoring period relative to the operational telemetry measurements received for a prior monitoring period immediately preceding the most recent monitoring period and to output a determination that replacement of the failed hardware component with the new replacement component of the hardware type having the identified power efficiency value at the client information handling system, in combination with execution of the remediation user instruction for the failed hardware component received from a user at the client information handling system will cause a future overall determined CO2 emissions value for the client information handling system to fall below the non-eco-friendly state transition threshold value;

transmitting an order instruction, via a network interface device, to an enterprise system component hub to transport the new replacement component of the hardware type to the client information handling system based on output from the execution of the computer readable code instructions of the neural network algorithm; and transmitting the remediation user instruction and a replacement user instruction for display to a user at the client information handling system to replace the failed hardware component with the new replacement component and to execute the remediation user instruction.

9. The method of claim 8, wherein the remediation user instruction includes capping access of a software application or of firmware to resources of a memory at the client information handling system.

10. The method of claim 8, wherein the remediation user instruction includes capping access of a software application or of firmware to resources of a client hardware processor at the client information handling system.

11. The method of claim 8, wherein the remediation user instruction includes capping access of a software application or of firmware to resources of a client network interface device at the client information handling system.

12. The method of claim 8, wherein the remediation user instruction includes updating an Operating System (OS) version executing via a client hardware processor at the client information handling system.

13. The method of claim 8, wherein the remediation user instruction includes updating a firmware version for a hardware component at the client information handling system.

14. The method of claim 8, wherein the remediation user instruction includes capping a number of active browsing hours per day at the client information handling system.

15. A unified endpoint management (UEM) platform information handling system executing a carbon dioxide (CO2) emissions state remediation system on comprising:

a network interface device to receive operational telemetry measurements, including user-adjustable operational telemetry measurements for a first client information handling system during a plurality of routine monitoring intervals, including power consumption usage levels across each of a plurality of hardware components of the client information handling system, software application operational consumption of hardware component resources for execution, and event viewer error logs;

the network interface device to receive indication that an overall determined CO2 emissions value exceeds a non-eco-friendly state transition threshold value determined for the first client information handling system, and an indication of a failed hardware component of the first client information handling system;

a hardware processor executing code instructions of the CO2 emissions state remediation system to identify a remediation user instruction associated with the failed hardware component of the first client information handling system;

the hardware processor executing computer readable code instructions of a trained neural network algorithm modeling a relationship between changes in CO2 emissions values and changes in the operational telemetry measurements over the plurality of routine monitoring intervals and to input the received operational telemetry measurements from a most recent, first routine monitoring interval, received operational telemetry measurements from a prior routine monitoring period immediately preceding the most recent, first routine monitoring interval, the overall determined CO2 emissions value exceeding the non-eco-friendly state transition threshold value, the indication of a failed hardware component, and an identified power efficiency value for a new replacement component of a same hardware type as the failed hardware component into the trained neural network algorithm;

the hardware processor executing computer readable code instructions of the trained neural network algorithm to output an indication that replacement of the failed hardware component with the new replacement component of the same hardware type having the identified power efficiency value at the first client information handling system, in combination with execution of the remediation user instruction at the first client information handling system will cause a future predicted CO2 emissions value for the first client information handling system determined based on the received operational telemetry measurements to fall below the non-eco-friendly state transition threshold value;

the hardware processor executing computer readable code instructions to generate a replacement user instruction to replace the failed hardware component with the new hardware component based on the output from the trained neural network algorithm; and the network interface device to transmit the remediation user instruction and a replacement user instruction for display to a user at the first client information handling system to replace the failed hardware component with the new replacement component and to execute the remediation user instruction.

16. The UEM platform information handling system of claim 15 further comprising:

the network interface device to receive confirmation that the user has implemented the remediation user instruction; and the network interface device to transmit a shipping instruction to an enterprise system component hub to transport the new replacement component to the first client information handling system.

17. The UEM platform information handling system of claim 15, wherein the neural network is trained using crowd-sourced operational telemetry measurements from a plurality of client information handling systems having usage profiles matching a first usage profile of the first client information handling system.

18. The UEM platform information handling system of claim 15, wherein the non-eco-friendly state transition threshold value is determined for each routine monitoring interval at the first client information handling system based on battery power consumption efficiency loss.

19. The UEM platform information handling system of claim 15, wherein the non-eco-friendly state transition threshold value is determined for each routine monitoring interval at the first client information handling system based on battery age.

20. The UEM platform information handling system of claim 15, wherein the non-eco-friendly state transition threshold value is determined for each routine monitoring interval at the first client information handling system based on testing telemetry measurements, including power analytics, software application analytics, event viewer error logs, and a determined CO2 emissions value measured during a preset testing period.

* * * * *